(12) United States Patent
Wang et al.

(10) Patent No.: US 12,216,589 B2
(45) Date of Patent: Feb. 4, 2025

(54) DRAINING OPERATION FOR DRAINING DIRTY CACHE LINES TO PERSISTENT MEMORY

(71) Applicant: Arm Limited, Cambridge (GB)

(72) Inventors: Wei Wang, Cambridge (GB); Matthew James Horsnell, Cambridge (GB)

(73) Assignee: Arm Limited, Cambridge (GB)

( * ) Notice: Subject to any disclaimer, the term of this patent is extended or adjusted under 35 U.S.C. 154(b) by 154 days.

(21) Appl. No.: 18/044,499

(22) PCT Filed: Aug. 16, 2021

(86) PCT No.: PCT/GB2021/052120
§ 371 (c)(1),
(2) Date: Mar. 8, 2023

(87) PCT Pub. No.: WO2022/053774
PCT Pub. Date: Mar. 17, 2022

(65) Prior Publication Data
US 2023/0325325 A1    Oct. 12, 2023

(30) Foreign Application Priority Data
Sep. 14, 2020   (GB) .................................... 2014440

(51) Int. Cl.
G06F 12/12    (2016.01)
G06F 9/46    (2006.01)
(Continued)

(52) U.S. Cl.
CPC .............. G06F 12/12 (2013.01); G06F 9/467 (2013.01); G06F 9/528 (2013.01);
(Continued)

(58) Field of Classification Search
CPC .......... G06F 9/467; G06F 9/528; G06F 12/12; G06F 12/0862; G06F 12/0897; G06F 2212/601
See application file for complete search history.

(56) References Cited

U.S. PATENT DOCUMENTS 7,225,299 B1    5/2007    Rozas et al.
10,445,238 B1    10/2019    Diestelhorst et al.
(Continued)

FOREIGN PATENT DOCUMENTS

WO    2019/138206 A1    7/2019

OTHER PUBLICATIONS

Xu, Yuanchao, et al. "Mitigating sync overhead in single-level store systems." Proceedings of the ACM International Conference on Computing Frontiers. 2016. (Year: 2016).*

(Continued)

*Primary Examiner* — Nicholas J Simonetti
(74) *Attorney, Agent, or Firm* — NIXON & VANDERHYE P.C.

(57) ABSTRACT

An apparatus has processing circuitry with support for transactional memory, and a cache hierarchy comprising at least two levels of cache. In response to a draining trigger event having potential to cause loss of state stored in at least one further level cache beyond a predetermined level cache in which speculative store data generated by a transaction is marked as speculative until the transaction is committed, draining circuitry performs a draining operation to scan a subset of the cache hierarchy to identify dirty cache lines and write data associated with the dirty cache lines to persistent memory. The subset of the cache hierarchy includes the at least one further level cache. In the draining operation, (Continued)

speculative store data marked as speculative in the predetermined level cache is prevented from being drained to the persistent memory.

17 Claims, 8 Drawing Sheets

(51) Int. Cl.
  *G06F 9/52* (2006.01)
  *G06F 12/0862* (2016.01)
  *G06F 12/0897* (2016.01)
(52) U.S. Cl.
  CPC ...... *G06F 12/0862* (2013.01); *G06F 12/0897* (2013.01); *G06F 2212/601* (2013.01)

(56) References Cited

U.S. PATENT DOCUMENTS

| | | | |
|---|---|---|---|
| 10,719,236 | B2 | 7/2020 | Hansson et al. |
| 2015/0378731 | A1 | 12/2015 | Lai et al. |
| 2016/0179687 | A1* | 6/2016 | Kumar ................ G06F 12/0895 711/135 |
| 2017/0269960 | A1* | 9/2017 | Diestelhorst ............ G06F 9/466 |

OTHER PUBLICATIONS

Lu, Youyou, et al. "Improving the Performance and Endurance of Persistent Memory with Loose-Ordering Consistency." IEEE Transactions on Parallel and Distributed Systems (2017). (Year: 2017).*
Hillel Avni, et al., "PHyTM: Persistent Hybrid Transactional Memory", Proceedings of the VLDB Endowment, vol. 10, No. 4, Copyright 2016 VLDB Endowment 21508097/16/12.
Dhruva R. Chakrabarti, et al., "Atlas: Leveraging Locks for Non-volatile Memory Consistency", OOPSLA '14, Oct. 20-24, 2014, Portland, OR, USA, Copyright 2014 ACM 978-1-4503-2585-1/14/10; http://dx.doiorg/10.1145/2660193.2660224.
Ellis Giles, et al., "Hardware Transactional Persistent Memory", MEMSYS, Oct. 1-4, 2018, Old Town Alexandria, VA, USA, 2018 Association for Computing Machinery. ACM ISBN 978-1-4503-6475-1/18/10; https://doi.org/10.1145/3240302.3240305.
Vaibhav Gogte, et al., "Persistency for Synchronization-free Regions", PLDI'18, Jun. 18-22, 2018, Philadelphia, PA, USA, 2018 Association for Computing Machinery, ACM ISBN 978-1-4503-5698-5/18/06.
Arpit Joshi, et al., "DHTM: Durable Hardware Transactional Memory", 2018 IEEE, DOI 10.1109/ISCA.2018.00045.
S. Scargall, "Persistent Memory Architecture", © The Author(s) 2020, https://doi.org/10.1007/978-1-4842-4932-1_2.

* cited by examiner

DRAINING OPERATION FOR DRAINING DIRTY CACHE LINES TO PERSISTENT MEMORY

The present technique relates to the field of data processing.

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflicts between threads accessing shared resources can be to use transactional memory support. A data processing system may have circuitry to support execution of a transaction within a thread of data processing. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

At least some examples provide an apparatus comprising: processing circuitry to support processing of a transaction comprising instructions processed speculatively between a transaction start instruction and a transaction end instruction, for which the processing circuitry is configured to prevent commitment of results of the speculatively processed instructions until the transaction end instruction is reached in the absence of the transaction being aborted; and a cache hierarchy comprising at least two levels of cache; in which: in response to a store instruction processed within a transaction, the processing circuitry is configured to write speculative store data to the cache hierarchy with the speculative store data marked as speculative to prevent the speculative store data passing beyond a predetermined level cache in the cache hierarchy to at least one further level cache until the transaction is committed; and the apparatus comprises draining circuitry to detect a draining trigger event having potential to cause loss of state stored in the at least one further level cache, and in response to detection of the draining trigger event, to perform a draining operation to scan a subset of the cache hierarchy to identify dirty cache lines and write data associated with the dirty cache lines to persistent memory, the subset of the cache hierarchy comprising the at least one further level cache, where in the draining operation, the draining circuitry is configured to ensure that dirty cache lines storing speculative store data marked as speculative in the predetermined level cache are prevented from being drained to the persistent memory.

At least some examples provide an apparatus comprising: means for processing instructions, supporting processing of a transaction comprising instructions processed speculatively between a transaction start instruction and a transaction end instruction, for which the means for processing is configured to prevent commitment of results of the speculatively processed instructions until the transaction end instruction is reached in the absence of the transaction being aborted; and means for caching data in a cache hierarchy comprising at least two levels of cache; in which: in response to a store instruction processed within a transaction, the means for processing is configured to write speculative store data to the means for caching with the speculative store data marked as speculative to prevent the speculative store data passing beyond a predetermined level cache in the cache hierarchy to at least one further level cache until the transaction is committed; and the apparatus comprises means for draining cached data to persistent memory, where in response to detecting a draining trigger event having potential to cause loss of state stored in the at least one further level cache, the means for draining is configured to perform a draining operation to scan a subset of the cache hierarchy to identify dirty cache lines and write data associated with the dirty cache lines to the persistent memory, the subset of the cache hierarchy comprising the at least one further level cache, where in the draining operation, the means for draining is configured to ensure that dirty cache lines storing speculative store data marked as speculative in the predetermined level cache are prevented from being drained to the persistent memory.

At least some examples provide a method comprising: processing a transaction comprising instructions processed speculatively between a transaction start instruction and a transaction end instruction, for which commitment of results of the speculatively processed instructions is prevented until the transaction end instruction is reached in the absence of the transaction being aborted; in response to a store instruction processed within a transaction, writing speculative store data to a cache hierarchy comprising at least two levels of cache, with the speculative store data marked as speculative to prevent the speculative store data passing beyond a predetermined level cache in the cache hierarchy to at least one further level cache until the transaction is committed; and in response to detection of a draining trigger event having potential to cause loss of state stored in the at least one further level cache, performing a draining operation to scan a subset of the cache hierarchy to identify dirty cache lines and write data associated with the dirty cache lines to persistent memory, the subset of the cache hierarchy comprising the at least one further level cache, where when performing the draining operation, dirty cache lines storing speculative store data marked as speculative in the predetermined level cache are prevented from being drained to the persistent memory.

Further aspects, features and advantages of the present technique will be apparent from the following description of examples, which is to be read in conjunction with the accompanying drawings, in which:

FIG. 1 schematically illustrates an example of a data processing system using persistent memory;

Figure 1:
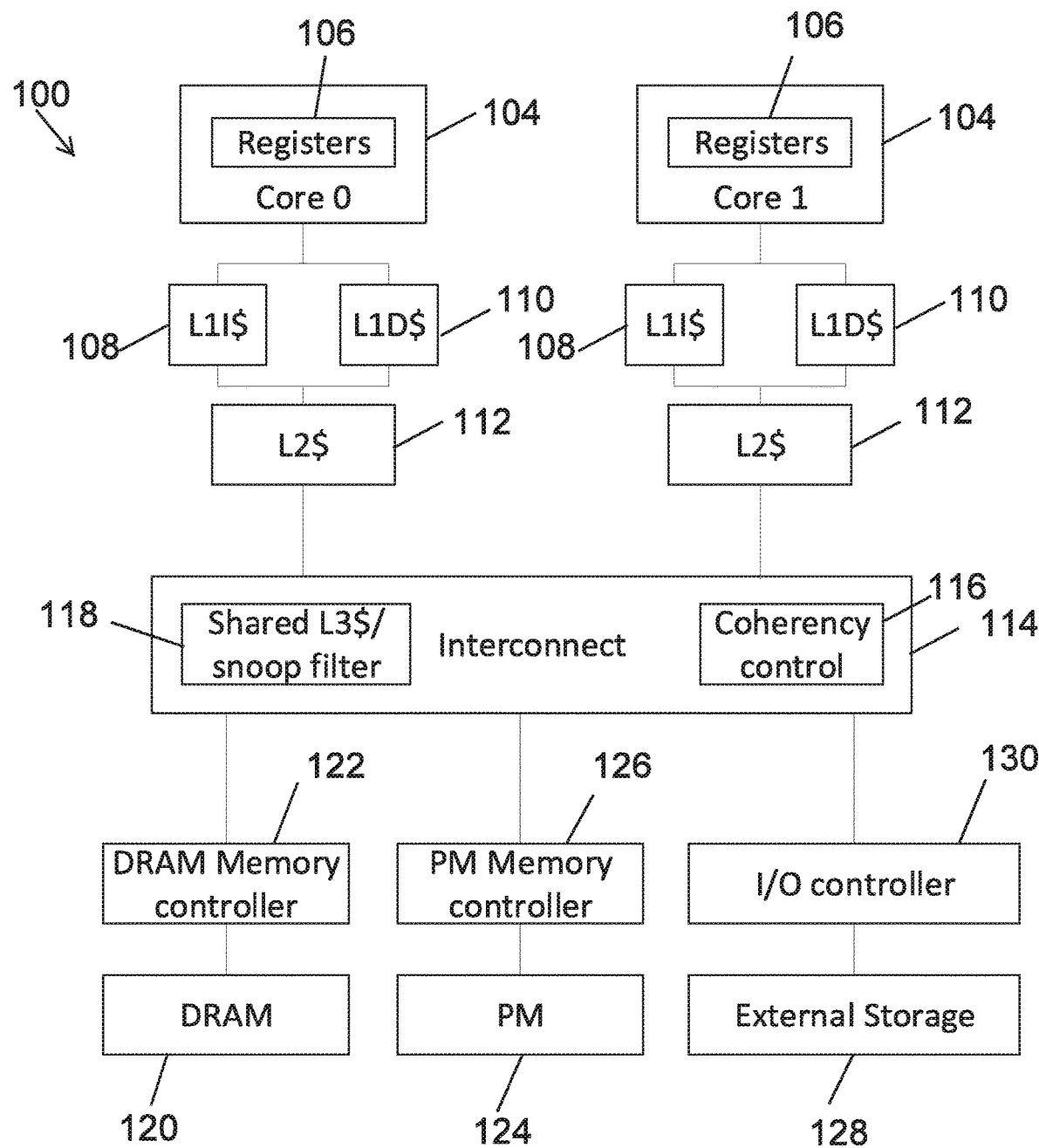

A data processing apparatus may have processing circuitry with support for hardware transactional memory, which provides hardware circuit logic which supports processing of transactions as described earlier. The processing circuitry may support processing of a transaction comprising instructions processed speculatively between a transaction start instruction and a transaction end instruction, and the processing circuitry may prevent commitment of results of the speculatively processed instructions until a transaction end instruction is reached in absence of the transaction being aborted. The processing circuitry may have access to a cache hierarchy comprising at least two levels of cache. In response to a store instruction processed within a transaction, the processing circuitry may write speculative store data to the cache hierarchy, with the speculative store data marked as speculative to prevent the speculative store data passing beyond a predetermined level cache in the cache hierarchy to at least one further level cache until the transaction has been committed. Preventing the speculative store data passing beyond the predetermined level cache while the transaction remains pending helps to prevent the speculative store data becoming visible to threads executing on other processor cores (which share the at least one further level cache with the core having the processing circuitry) before the transaction has been committed, so that the transaction's results are perceived atomically by other threads.

Once a transaction has been committed then any store data previously marked as speculative in the predetermined level cache may subsequently be allowed to be written back to further levels of cache in the cache hierarchy or to main memory. This may occur over a period of time after commitment of the transaction, as cache lines of the predetermined level cache are evicted to make way for other data, so after commitment of a transaction there may be a period of time when only part of the data generated in a transaction has been written back to main memory but other parts of the data generated by the transaction have not yet been written back. In typical systems providing hardware support for transactional memory, this is not a problem because, although for a temporary period the data stored in main memory may only reflect part of the updates made by the transaction and so does not provide an atomic view of the effects of the transaction, this only lasts for a limited period, and in the meantime accesses to the addresses involved in the transaction from other threads would hit in higher levels of the cache hierarchy (or trigger snoops to caches associated with other cores), so that those other threads see the latest data generated by the already-committed transaction. Also, in a typical system supporting hardware transactional memory, the main memory has generally been implemented using a volatile form of memory storage, such as dynamic random access memory (DRAM), and so even if a power failure of unexpected reset event were to occur in the period when only part of the store data relating to a transaction has been written back to main memory, then that power failure or reset would cause the state saved in main memory to be lost, and so when the system then powers on again after the power failure or is reset to a known state in response to a reset event, any partial effects of the transaction will be lost and so this still does not cause any long term visibility to other threads of partial effects of a transaction, so atomicity is retained.

However, increasingly, processing systems are using persistent memory (PM), where non-volatile memory is used to provide at least part of the random access memory used to store the working data of a process being executed on the processing circuitry. This contrasts with traditional systems where non-volatile memory storage would typically only have been accessible using input/output (I/O) mechanisms, which are restricted to bulk transfers and are relatively slow. It may be useful to enable transactional memory to be used in combination with PM, because the transactional memory functionality could be useful (even for sequential programs, rather than in the presence of multiple parallel threads) to ensure failure atomicity with regards to PM. Due to the introduction of PM, any sequential program may be considered to have a concurrent observer in the PM (recovery observer), similar to the way in which a concurrent thread or another processor core can be considered a concurrent observer of the state generated by the transaction in the parallel thread/core examples discussed earlier. It may be desirable to ensure that updates to PM caused by a sequential section of code are implemented atomically to ensure failure atomicity. Transactional memory can be a convenient way of implementing this.

However, typical transactional memory systems do not tend to work well with PM. When PM is used, it is possible that data can be written to PM in response to cache line evictions or write backs from the cache hierarchy. This means that, unlike in systems which only provide non-volatile memory via an I/O port, the PM may gradually be updated with the store data from a committed transaction over a period of time after the transaction is committed. As the PM is non-volatile, then if a power failure or unexpected reset occurs during that period, then once the system resumes processing after power has returned or the reset has been performed, the PM may be storing partial results of the transaction, which risks loss of atomicity. Hence, existing systems supporting transactional memory would not work in a plug-and-play manner when volatile memory is replaced or supplemented with PM.

One technique for addressing this problem is to require that, as a transaction is processed, a hardware log tracking addresses involved in processing of the transaction is required to be made in the PM, so that if a reset or power failure occurs then on recovering from that the hardware log can be used to identify what changes to the data in PM need to be made to either unroll the changes made in response to the transaction or enforce remaining changes caused by the transaction which had not yet been drained to PM. However, such hardware logging incurs a performance and power consumption cost. In some examples, dedicated instructions are provided in the instruction set architecture for allowing a transaction to request that data is propagated beyond the predetermined level cache while the transaction still remains pending. Such techniques require non-trivial changes in the caches, memory controllers and/or instruction set architecture relative to designs which do not support PM, and so can be hard to implement.

In the examples below, the apparatus comprises draining circuitry to detect a draining trigger event having potential to cause loss of state stored in the at least one further level cache (the cache(s) beyond the predetermined level cache of the cache hierarchy at which speculative store data associated with a pending transaction is marked as speculative). In response to detection of the draining trigger event, the draining circuitry performs a draining operation. The draining operation comprises scanning a subset of the cache hierarchy to identify dirty cache lines and write the data associated with the dirty cache lines to PM. The subset of the cache hierarchy involved in the scanning for the draining operation comprises at least the at least one further level cache which is beyond the point at which speculative store data for a transaction is marked. In the draining operation, the draining circuitry ensures that dirty cache lines storing speculative store data which is marked as speculative in the predetermined level cache are prevented from being drained to the PM.

Hence, some circuitry is provided to scan the cache hierarchy for any dirty lines which can be written to PM in response to detecting a draining trigger event having potential to cause loss of state. This may be simpler to implement in hardware than the changes to the caches, memory controllers and/or ISA described above, and avoids the performance cost of implementing hardware logging of the transaction's addresses in PM. This enables a system supporting hardware transactional memory to be implemented even if part of the main memory is implemented as PM, but with less additional development effort needed to make the hardware transactional memory features compatible with PM. Also, this approach enables software written for existing hardware transactional memory systems to be executed unchanged on systems using PM, as there is no need for the software to be recompiled to include additional instructions for enforcing writes to PM inside a still-to-be-committed transaction.

In one example the subset of the cache hierarchy scanned by the draining circuitry in the draining operation may exclude the predetermined level cache, which is the cache at which speculative store data associated with a transaction is marked as speculative to prevent it passing beyond the predetermined level cache. In some systems, it may not be necessary for the predetermined level cache to be scanned in order to ensure that any data generated by a committed transaction is drained to PM.

For example this approach may be suitable when the next level cache in the hierarchy after the predetermined level cache is an inclusive cache for which all addresses cached in the predetermined level cache are also allocated cached entries in the next level cache. In that case, state associated with cache lines in the next level cache after the predetermined level cache may be sufficient to determine whether there is any data in the predetermined level cache that may need to be drained to memory, so that a scan of the predetermined level cache itself is not necessary.

By excluding the predetermined level cache from the scanning performed in the draining operation, this reduces the overall time taken to perform the scanning operation and hence saves power. This can be particularly useful in implementations which perform the draining operation based on power from a backup power supply, as discussed further below, as in that case reducing the overall period taken to perform the draining operation can enable backup power supplies with a smaller energy capacity to be used.

Alternatively, for other implementations the subset of the cache hierarchy scanned by the draining hierarchy may include the predetermined level cache. For example, this approach could be used if the next level cache after the predetermined level cache is an exclusive cache or non-inclusive cache so that an entry cached in the predetermined level cache may not necessarily also have a corresponding entry cached in the next level cache. If the scanned subset of the cache hierarchy includes the predetermined level cache, then when the draining circuitry scans the predetermined level cache to identify the dirty cache lines, the draining circuitry may prevent dirty cache lines marked as speculative from being drained to the PM. Hence, when scanning the predetermined level cache then only non-speculative cache lines may be allowed to be drained to PM. This prevents the partial results of a not-yet-committed transaction from becoming visible in PM, to provide the atomicity guarantee for the transactions.

In some implementations, a memory controller for controlling writing of data to memory may have a write queue for queueing data waiting to be written to the PM. In a similar way to the cache hierarchy, at the point when the draining trigger event occurs there could be some data still in the memory controller write queue, which has not yet been written back to PM, and so the draining trigger event could also cause the memory controller write queue to lose its state. If following commitment of an earlier transaction only part of the data associated with that transaction has been written to PM and some data in the memory controller write queue has not yet been written, then this could again pose a risk to atomicity. Hence, in response to the draining trigger event, the draining circuitry may also cause pending write data stored in the memory controller write queue to be written to the PM. This approach may be useful if the memory controller write queue is implemented using a volatile memory storage.

However, in other systems the memory controller write queue could itself use a non-volatile form of storage, and in this case it is not necessary to scan the memory controller write queue for data to be written to the PM.

In some implementations all of the caches in the cache hierarchy may be implemented using a volatile form of storage technology, and so it can be useful for the scanning performed in the draining operation to cover a last-level cache of the cache hierarchy.

However, in other examples the last-level cache of the cache hierarchy (and optionally one or more higher level caches) could be implemented using PM. In this case, the draining operation may comprise draining the dirty cache lines from the at least one further level cache to the last-level cache, so that it may not be necessary to drain the data all the way to main memory. Hence, the PM discussed above could include the last-level cache of the cache hierarchy. Also, if the last-level cache on the cache hierarchy is implemented using PM, then it is not necessary to scan the last-level cache in the draining operation, as it will retain its data after the draining trigger event, and so does not pose a risk to loss of atomicity for the store data generated in a transaction. Therefore, when the last-level cache of the cache hierarchy is implemented using PM, the subset of the cache hierarchy scanned in the draining operation may exclude the last-level cache. Similarly, if a cache higher up in the hierarchy than the last-level cache is implemented using PM then that cache can also be excluded from the scanned subset of the cache hierarchy.

The draining trigger event may be any event which has the potential to cause loss of states stored in at least one further level cache of the cache hierarchy. For example the draining trigger event could be a reset event, which may occur when a reset input to the processing system is asserted. For example the system may be reset when a power-off or restart button is pressed by the user. The reset input may also be asserted in response to some types of interrupt or exception which indicate that a non-recoverable error has occurred. In response to the reset event, storage elements such as flip-flops of the processing circuit may be reset to some default state (either binary zero or binary one depending on the particular storage element). This may cause loss of state when storage elements within a cache are reset. Therefore, when a reset event occurs, it can be useful to perform the draining operation to scan the subset of the cache hierarchy and write data associated with dirty cache lines to PM, before resetting the corresponding storage elements which stored the dirty data.

Another example of a draining trigger event may be a power down event, when a drop in power is detected on a main power supply used to supply the processing circuitry with power. The power-down event could be an event when power is suddenly interrupted which may cause volatile storage circuits to lose their state. The power down event could also be a planned power-down event to save energy, such as entry into a sleep or hibernate mode, for example by power gating caches and cores to save energy. Regardless of whether the power down event is planned or unplanned, the power down event risks loss of data in the at least one further level cache of the cache hierarchy. By performing the draining operation in response to the draining trigger event this preserves the results generated by a committed transaction to ensure atomicity when the system subsequently powers up again.

Also, the draining operation prevents violations of transaction ordering requirements. For example, it may not be allowed for a younger committed transaction to be persisted atomically when an older committed transaction is not persisted to PM, so by performing the draining operation when the draining trigger event is detected, this ensures outstanding writebacks of older committed transactions are propagated to PM, avoiding the ordering violations.

The draining circuitry and the at least one further level cache may be coupled to a backup power supply input for supplying backup during the draining operation. The backup power supply input may be separate from a main power supply input for supplying power to the processing circuitry. The main power supply input may also supply power to the cache hierarchy during normal operation, but during the draining operation if the main power supply is not available then the cache hierarchy may be supplied with power from the backup power supply input instead. By proving a backup power supply input, this can provide energy for performing the draining operation even when a power down event has occurred interrupting the main power supply. The backup supply input may be a pin on the integrated circuit comprising the processing circuitry and draining circuitry, through which power is supplied from a backup power source such as the battery or capacitor. The battery or capacitor itself may not be part of the integrated circuit implementing the apparatus defined in the claims, as a battery or capacitor may be coupled to the backup supply input in a downstream step of the manufacturing/supply chain, so may not be present at the point when an apparatus comprising the processing circuitry, caches, draining circuitry and backup supply input is manufactured or supplied to a customer.

The backup power supply is not essential for supporting the draining circuitry described above, as even without a backup power supply it would still be possible to perform the draining operation when a reset event occurs as the draining trigger event as discussed above. However, providing a backup power supply input can be useful to allow the system to also perform the draining operation in response to a power down event. For example the backup power supply can be a battery or supercapacitor which may supply a certain amount of power for a period long enough to support the scanning and writeback operations performed for the draining operation. The particular charge capacity needed for the battery or supercapacitor may depend on the size of the caches and the expected latency of the scanning/writeback operations, so may vary from implementation to implementation.

When a backup power supply is used then it can be particularly useful to exclude the predetermined level cache from the scanned subset of the cache hierarchy, as this may allow more affordable batteries or capacitors to be used as the backup supply instead of needing relatively expensive uninterruptable power supplies (UPS) which are typically provided as backup power for large-scale servers. Hence, designing the apparatus to exclude the predetermined level cache from the scanned subset of the hierarchy can help to reduce the overall cost of implementing the backup power supply.

Similarly, in examples where the memory controller write queue is also subject to the draining operation to drain data to PM from the memory controller write queue, then the memory controller write queue may also be coupled to the backup power supply input to allow it to be supplied with backup power during the draining operation.

The predetermined level cache may also be coupled to the backup power supply input to enable it to be supplied with power even if a power down event has occurred in the main power supply. This may be useful not only if the predetermined level cache is part of the scanned subset of the cache hierarchy as in the second implementation discussed earlier, but also it can be useful to supply backup power to the predetermined level cache even when the scanned subset of the cache hierarchy scanned by the draining circuitry excludes the predetermined level cache as in the first example described earlier. This may be seen as counter-intuitive. However, even if the predetermined level cache is not itself scanned, it is possible that cache lines within the next-level cache could be marked as "modified-but-stale", to indicate that the cache line has been modified with respect to the corresponding copy of the data in memory, but the most up-to-date version of the data associated with the cache line may actually be stored in the predetermined level cache. In some implementations, a "modified-but-stale" cache line may be one marked as both dirty and invalid (dirty, because it differs from the underlying copy of the data in memory, and invalid because the valid data for the corresponding address is present in the predetermined level cache). However, other implementations may provide a different way of identifying modified-but-stale lines (e.g. the modified-but-stale cache line could still be marked as valid, but there could be a separate flag or coherency state indicator which indicates that it is a modified-but-stale line). When scanning of the at least one further level cache identifies a modified-but-stale cache line, then the draining circuitry may trigger a snoop request to be issued to the predetermined level cache to request updated data associated with a modified-but-stale cache line, and in response to receiving the updated data may write the updated data to the PM. The triggering of the snoop request by the draining circuitry could be performed directly by the draining circuitry, or indirectly (e.g. scanning a given level of cache may cause that cache to issue the snoop in cases where a line is identified to be modified-but-stale, so the draining circuitry may not itself need to directly issue the snoop request).

Hence, it can be useful to supply the predetermined level cache with backup power even if it is not itself being scanned in the draining operation, to allow the predetermined level cache to respond to any snoop requests issued from a further level cache in the cache hierarchy triggered by the scanning operation performed in that further level cache.

If the predetermined level cache receives such a snoop request specifying a snoop target address associated with speculative store data marked as speculative in the predetermined level cache (to signify that it is data associated with a still-to-be-committed transaction), then the predetermined level cache may return a snoop response indicating that the data associated with the snoop target address is not available within the predetermined level cache (even though that data really is available, but is being prevented from being propagated to a further level cache to ensure the not-yet-committed transaction's store data is viewed atomically by other threads).

The cache lines in the predetermined level cache may each be associated with an exclusive indicator. The exclusive indicator for a given cache line indicates whether or not the corresponding data is speculative store data for a pending transaction. The predetermined level cache prevents the speculative store data in the given cache line being made visible beyond the predetermined level cache when the exclusive indicator for the given cache line has a first value, and allows speculative store data in the given cache line to be propagated to a further level cache when the exclusive indicator for the given cache line has a second value.

The exclusive indicator may not be the only type of metadata associated with cache lines in the predetermined level cache that is used to track transactional processing. The predetermined level cache may also store working set tracking indicators to mark cache lines stored in the predetermined level cache as being associated with a working set of addresses accessed within a transaction. This can be useful for tracking conflicts between addresses accessed within a transaction and addresses accessed by other threads, so that the transaction can be aborted if an address conflict between the transaction and the other thread is detected which could risk loss of atomicity.

The predetermined level cache may be any cache in the cache hierarchy at which such exclusive indicators and/or working set tracking indicators are stored. In some systems the tracking associated with transactions could be performed at a level two cache or a further cache in a cache hierarchy.

However, in practice it may be simplest if the predetermined level cache is a level one data cache, which is the first level of cache accessed when a load/store operation is performed by the processing circuitry.

The predetermined level cache may be a private cache which is private to the processing circuitry in a given processor core and cannot be accessed directly by other processor cores (although those other processor cores may snoop the level one cache which is private to the first core in some scenarios).

The techniques discussed above can be particularly useful where a next level cache beyond the predetermined level cache in the cache hierarchy is an inclusive cache. This means that any address cached in the predetermined level cache would also have an entry allocated for that address in the next level cache. When the next level cache is inclusive, this means that any dirty data in the predetermined level cache which has not yet been written back to PM can be identified from a scan of the next level cache so it is not essential to include the predetermined level cache in the scan subset of cache hierarchy, enabling power savings by reducing the number of cache lines in the cache hierarchy that need to be scanned, hence reducing the power consumed in performing the draining operation.

The persistent memory may comprise any form of memory for which the contents of the memory may remain available after a power cycle or other reboot. For example, 'persistent memory' may include non-volatile memory such as core memory, flash memory, magneto-resistive random access memory (MRAM), ferroelectric RAM (F-RAM), phase-change RAM (PCRAM), resistive RAM (ReRAM), correlated-electron RAM (CeRAM) and other memory technologies that are inherently non-volatile. In addition, 'persistent memory' may include main memory that is automatically backed-up up to non-volatile memory (such as flash memory) and reloaded following a power cycle. For example, non-volatile, dual inline memory module (NVDIMM-N) combines a DIMM, DRAM, flash storage and small power supply in the same module.

The PM may be byte-addressable memory. That is, the PM may support access to individual bytes of data rather than only supporting access to larger blocks of data. For example, for a range of memory addresses mapped to the PM, each distinct binary value of a memory address that can be generated by the processing circuitry within that range may correspond to a distinct byte of data within PM (note that, even if the processing circuitry requests access to only a single byte within the PM, it is possible that some hardware implementations may nevertheless return a larger block of data from the PM and cache that larger block, in anticipation that it is possible the processing circuitry could later require other portions of that block). In contrast, most non-volatile storage accessible through input/output ports may be block-addressable, supporting access only at a coarser granularity than PM (e.g. access in blocks of 512 bytes, to give one example). Traditionally non-volatile storage has been used only for bulk storage of data or program code for offline storage, rather than storing working data being updated regularly during the processing of program code. In contrast, with the development of PM technologies such as MRAM or PCRAM for example, it is becoming feasible to provide byte-addressable PM which opens up the opportunity to use the PM to store regular working data within the main random access memory of the processor, but this introduces the issues associated with combining PM with support for transactional memory as discussed above, which can be addressed using the draining circuitry described earlier.

The PM may comprise at least one off-chip PM module, and/or at least one on-chip PM module acting as one or more buffers. For example, the buffers may include on-chip caches, scratchpad memories, or buffers within a memory controller or interconnect, for example.

FIG. 1 schematically illustrates the example of a data processing system 100 comprising processor cores 104. Each core 104 can execute program instructions to perform data processing operations on operands stored in registers 106. Instructions fetched for execution by the core 104 may be fetched from a level 1 instruction cache (L1I$) 108. The L1I$ 108 is part of a cache hierarchy which also includes a level 1 data cache (L1D$) 110, a level 2 cache (L2$) 112 which is accessed on a miss in either the L1I$ 108 or a L1D$ 110 and a shared level 3 cache (L3$) 118 which is shared between the processor cores 104. The level 1 caches 108, 110 and the L2$ 112 are private to an individual core. The load/store instructions executed by a given core 104 trigger an access to that core's L1D$ 110. If the request misses in the L1D$, a request is made to the L2$ 112 of that core or to the shared L3$ 118, or to memory 120, 124, 128 if the request misses in all the caches.

In this example, the L1D$ 110 is a write-back cache, so that when the processor core 104 writes to an address which is valid in the L1D$ 110, then the data is updated and marked as dirty, and is not immediately written back to the L2$ 112 or further levels of cache or memory, unless the data for that address is evicted from the L1D$ 110 or requested by another core or some other trigger for write-back is encountered. Alternatively, some systems may support the ability to define certain regions of address space as write-through and others as write-back, and in this case writes to cache lines associated with addresses in the write-back region(s) may be marked as dirty and not immediately written back to memory, and writes to cache lines associated with addresses in the write-through region(s) may trigger a writeback to the L2$ 112 or beyond at the time of updating the L1D$ 110.

Also, in this example the L1D$ 110 is a write-allocate cache, which means that when data not previously cached in the L1D$ is accessed by the processor core 104 from the L2$ 112 or below, then as well as returning the data to the core 104 the returned data is also allocated into the L1D$ 110.

The L2$ 112 is private to an individual core. The L2$ 112 is an inclusive cache, which means that any address cached in one of the level 1 caches 108, 110 of a given core 104 also has a corresponding entry within the L2$ 112 for that core. The level 2 caches 112 are within a coherency domain managed by coherency control circuitry 116 of an interconnect 114 for connecting the respective cores 104. The coherency control circuitry 116 may implement a coherency protocol (e.g. a snoop-based or directory-based protocol) to ensure that when data for a given address is updated by one core then subsequently other cores will see the updated data if they access the same address. In some examples the shared L3$ 118 may also act as a snoop filter which may at least partially track which addresses are cached in the private caches 110, 112, 108 of a particular core 104, to help with reducing the overhead of snooping caches on writes by other cores (e.g. this allows snoops to caches known from the snoop filter 118 not to be storing the data for a given address can be eliminated). Any known coherency protocol may be used by the coherency control circuitry 116 to manage coherency. In this example the L3$ 118 is shown as being provided within the interconnect, but in other examples the L3$ 118 could be a separate block from the interconnect. Also it is possible to implement a snoop filter as a separate structure from the L3$ 118.

The byte-addressable memory accessible via the interconnect 114 includes volatile memory 120 (in this example, dynamic random access memory (DRAM)), access for which is controlled by a DRAM memory controller 122. Also, the byte-addressable memory include persistent memory (PM) 124, which may be any of the forms of PM described earlier. A PM memory controller 126 is provided for controlling access to the PM 124. The PM is non-volatile memory storage which is byte-addressable, which means that individual bytes of data stored in the PM may be independently addressed by the processor core 104.

The interconnect 118 may also support access to external storage 128, such as an external flash memory drive, which is accessed via an input/output (I/O) controller 130. Unlike the byte-addressable memory 120, 124, the external storage 128 can only be accessed in bulk at a granularity of blocks of addresses greater than one byte (e.g. each block could be 512 bytes for example). Whereas the DRAM 120 or PM 124 may be accessed frequently and used to store working data which is accessed on an ongoing basis during the main computational processing of a program executing on the processor core 104, the external storage 128 may be provided for long term offline storage of files such as program code, image data, or other files which are not accessed regularly during the ongoing processing of code. The performance when accessing external storage 128 may be much slower than access to DRAM 120 or PM 124.

The DRAM 120 is volatile storage and so when a power failure occurs, or a reset event occurs for resetting storage elements of the apparatus 100 to a known state, then any state stored in the DRAM 120 may be lost. The PM 124 and the external storage 128 are non-volatile and so can retain their state even if a power failure or reset occurs (the reset event may not clear contents of the PM 124). While the example of FIG. 1 shows a system having DRAM 120, this is not essential and in other examples the entire byte-addressable portion of the memory space may be implemented using PM 124. Similarly provision of external storage 128 is not essential. Also, in some implementations the shared L3$ 118 could also be implemented using PM 124 to provide a non-volatile storage for the data in the L3$ 118.

Figure 2:
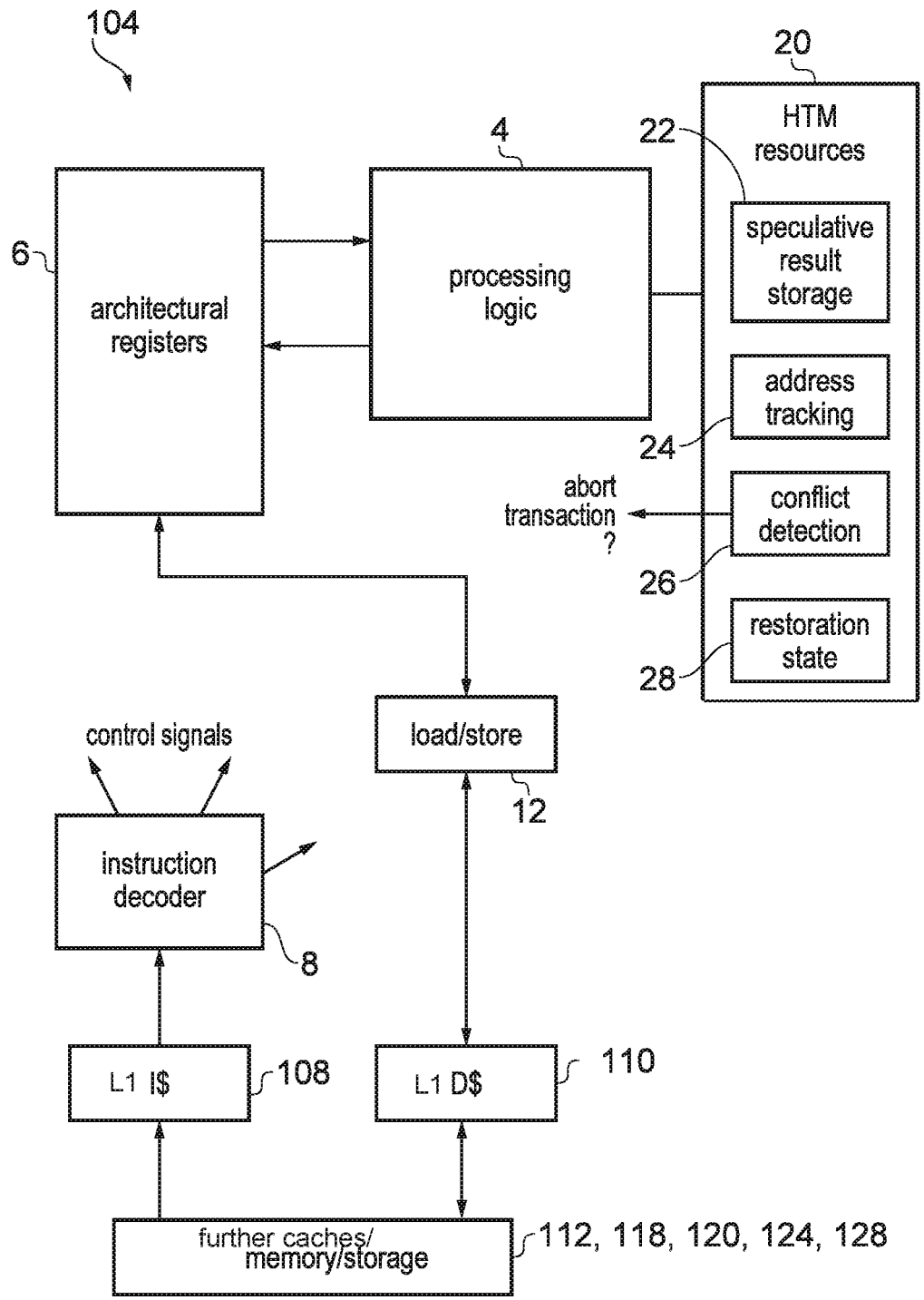
FIG. 2 illustrates an example of processing circuitry provided with transactional memory support.

FIG. 2 illustrates in more detail elements of the processor core 104 for hardware transactional memory (HTM) support. The processor core 104 has processing logic 4 for executing instructions to carry out data processing operations. For example the processing logic 4 (processing circuitry) may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. The processor core 104 includes a set of architectural registers 6 provided for storing operands for the instructions executed by the processing logic 4 and for storing the results of the executed instructions. The processor core 104 also has an instruction decoder 8 which decodes instructions fetched from the L1I$ 108 to generate control signals for controlling the processing logic 4 or other elements of the data processing apparatus 104 to perform the relevant operations. The processor core 104 also includes a load/store unit 12 to perform load operations (in response to load instructions decoded by the instruction decoder 8) to load a data value from the L1D$ 110, or further caches 112, 118, main memory 120, 124 or external storage 128 into the architectural registers 6, and store operations (in response to store instructions decoded by the instruction decoder 8) to store a data value from the architectural registers 6 to the caches 110, 112, 118, memory 120, 124 or external storage 128.

Figure 5:
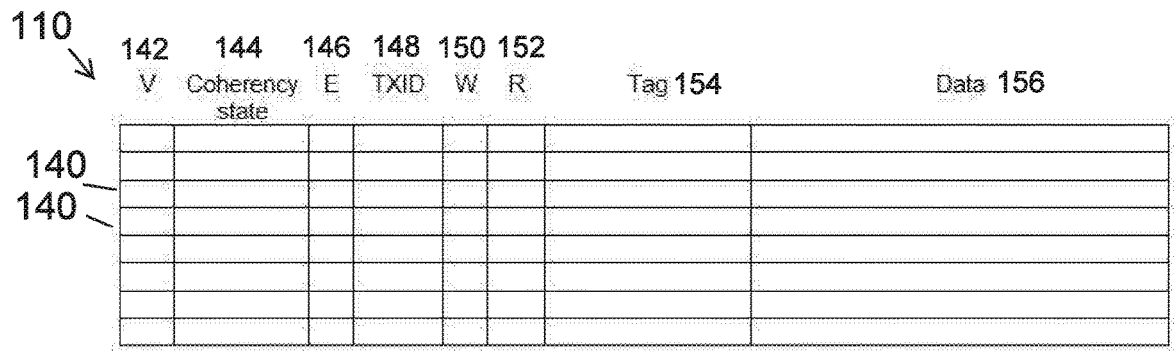
FIG. 5 illustrates an example of cache lines of a level one data cache.

The apparatus 104 also has transactional memory support circuitry 20 which provides various resources for supporting hardware transactional memory (HTM). The HTM resources in the transactional memory support circuitry 20 supports the processing of transactions by the processing logic 4, where a transaction is a series of instructions for which the processing logic 4 does not commit any results of speculatively executed instructions until the transaction has completed. The transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted. Although the address tracking circuitry 24 is indicated separately in FIG. 2, as discussed below, in some implementations (as in the example of FIG. 5 shown below), the address tracking circuitry 24 may be implemented at least in part using the L1D$ 110 which includes indications of which addresses are in a read set or write set tracked for the transaction. Similarly, the speculative result storage 22 may also be combined with the L1D$ 110 as data stored in the L1D$ may be marked as speculative to indicate that it is not to be committed until the corresponding transaction has been committed.

During processing of the transaction by the processing logic 4, results of some speculatively executed instructions (e.g. store instructions for storing data to the cache 110, 112, 118 or to memory 120, 124) are stored temporarily in the speculative result storage 22 (e.g. the L1D$ 110), to be committed once the transaction has completed (assuming it is not aborted). An abort of the transaction may be triggered when the conflict detection circuitry 26 determines that an address in a read set of addresses (e.g. the addresses of the locations in memory that have been subject to a read access triggered by an instruction in the transaction) has been written to by an instruction outside of the transaction. In the case of an abort, the restoration state storage 28 is used to restore the state of the architectural registers 6 to their state before processing of the transaction begun.

It is possible for transactions to be nested so that a further transaction start instruction is received before the transaction end instruction corresponding to a previous transaction start instruction has been encountered, and while the earlier transaction is still pending and has not been aborted. A nesting depth register may track the current nesting depth of transactions to distinguish cases when no transactions have been started, when just a single transaction has been started, or when a further nested transaction has been started within a previous transaction. When no transactions have yet been started the nesting depth may be 0. In response to the first transaction start instruction, the nesting depth may be incremented to 1. If a further nested transaction is started then the nesting depth may be incremented again to 2, and so on. On committing a transaction, the nesting depth may be decremented. Hence, as each respective nested transaction commits, the nesting depth is gradually unwound until all the transactions have committed and the nesting depth is back to 0 again. In some implementations, the nested transactions may be treated as one large transaction, so that the transaction start operations are performed in response to the transaction start instruction of the outer-most transaction, and the transaction commit operations are performed in response to the transaction end instruction of the outer-most transaction. This can simplify circuit implementation as there is no need to maintain multiple sets of restoration state for each nested transactions, for example. The inner-nested transactions may in this case be committed once the outer-most transaction is committed.

Figures 3, 4:
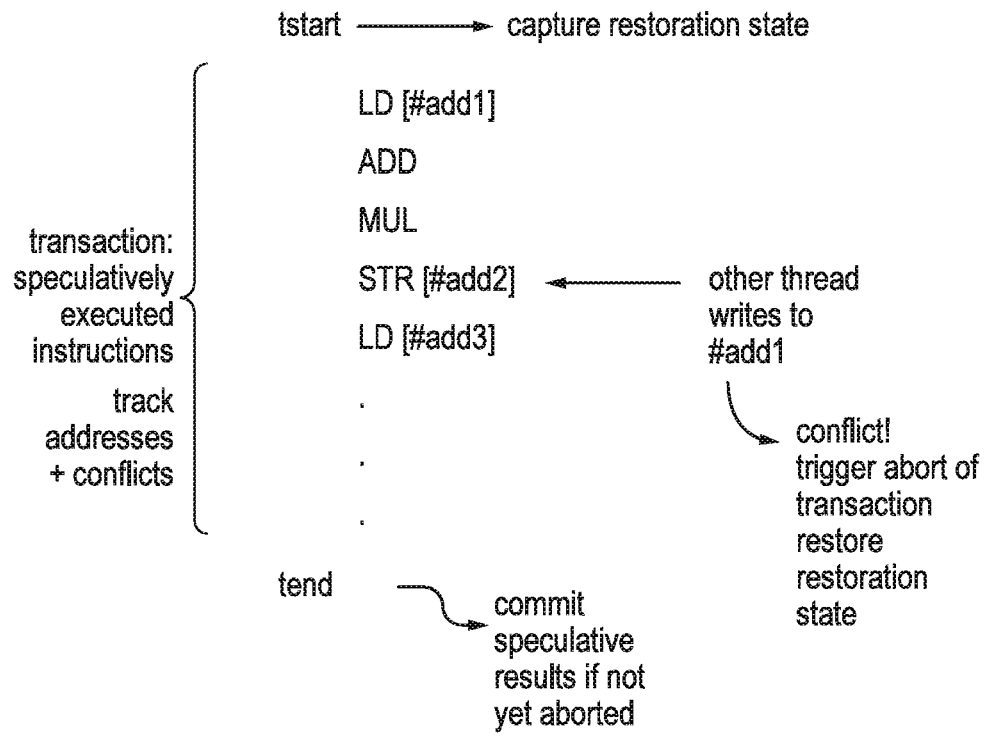
FIG. 3 shows an example of instructions processed speculatively within a transaction.
FIG. 4 shows an alternative example of executing the operations of FIG. 3 using a lock-based approach.

FIG. 3 shows an example of executing a transaction within a given thread using the transactional memory support circuitry 20 and the processing logic 4. A transaction is a section of program code which is bounded by a transaction start instruction (tstart) and a transaction end instruction (tend). As shown in FIG. 3, in response to the transaction start instruction the current architectural state in the architectural registers 6 is captured and stored in the restoration state storage circuitry 28. The processing logic 4 begins to perform speculative execution of the subsequent instructions following the tstart instruction, and as these instructions are executed, the addresses accessed by those instructions are tracked by the address tracking circuitry 24, and the conflict detection circuitry 26 detects conflicts between the tracked addresses and addresses of accesses made using the load/store unit 12 in response to other threads (or conflicts between the tracked addresses and addresses accessed by other cores 104—such conflicts could be detected based on snoop requests sent by the interconnect 114 in response to the memory accesses issued from the other cores 104). At least some speculative results of the instructions within the transaction are stored within the speculative result storage circuitry 22. For example the value stored in the cache or to memory in response to a store instruction STR may be held in the speculative result storage 22 (e.g. the L1D$ 110 with the cache line marked as speculative) while the transaction remains pending. If the transaction end instruction (tend) is reached without an abort event occurring in the meantime, then in response to the transaction end instruction the speculative results are committed (e.g. speculative indications on cache lines in the L1D$ 110 associated with that transaction are cleared). After committing the transaction, any results stored in the speculative results storage 22 for that thread may be allowed to be written to parts of the memory system other than the L1D$ 110 and the restoration state 28 can be discarded or permitted to be overwritten as it is no longer needed to rewind architectural state to the point before the transaction start instruction was encountered.

On the other hand, if an abort event occurs, for example when a conflict is detected by the conflict detection circuitry 26 when another thread accesses an address already accessed by the transaction, then an abort of the transaction is triggered and the restoration state from the restoration state storage 28 is restored to the architectural registers 6. Other causes of an abort event could for example include execution of an instruction which is not allowed to be executed within a transaction, insufficient resource within the speculative result storage 22 or address tracking circuitry 24 for handling the speculative results or addresses required by a given transaction, or an interrupt being received during the transaction.

FIG. 3 shows how a certain set of processing operations to be performed may be performed in a transactional mode using the transaction start and end instructions. As shown in FIG. 4, the same set of processing operations can also be performed in a non-transactional mode using a lock-based mechanism. In this case, before starting the critical section of code governed by the lock, at least one lock checking instruction 40 checks a lock variable in memory identified by a locking address #addLock and checks whether the lock variable indicates that another thread already holds the lock. If another thread holds the lock, then the processing does not progress beyond the lock checking instruction 40 until the lock is released. Once the lock is determined to be available then the lock is claimed by writing a given value (e.g. binary 1) to the lock address #addLock. For example, the lock checking instruction 40 could be implemented using an atomic compare and swap instruction which compares the current value stored at the specified address to determine whether the lock is held, and updates the lock variable to claim the lock if the lock is unclaimed. Alternatively the lock checking could be implemented with a series of multiple instructions to read the lock, test the value of the lock and either cause the processing to be deferred if the lock is already claimed, or claim the lock by updating the lock variable if the lock is currently unclaimed. Having completed the section of code guarded by the lock, another instruction 42 may release the lock once exclusive access to the resource guarded by the lock is no longer required. For example the resource guarded by the lock may be the data locations identified by various addresses which are accessed during the intervening section of code.

A lock-based approach as described above may be useful in situations where, for example, frequent aborts are likely to occur if using a transactional mode. Code written to use transactional memory may default back to a lock-based system if frequent aborts do occur during a transaction, in order to allow the sequence of instructions to complete. However, when execution of a transactional-memory-based code sequence succeeds and the transaction is committed, this can often be more efficient than lock-based systems.

FIG. 5 shows an example of a portion of the L1D$ 110 of a particular processor core 104 with support for functioning as the address tracking circuitry 24 and speculative result storage 22 of the HTM resources 20. The L1D$ 110 includes a number of cache lines 140. Each cache line (or cache entry) stores cached data 156 for a corresponding memory address, and a tag value 154 which can be used to identify which address has its data cached in the corresponding cache line. The data 154 in an individual cache line 140 may be stored at a cache line granularity which may be greater than the byte-size granularity with which individual items of data can be requested by the processor core 104, so the data field 156 in a cache line may be multiple bytes wide and the tag 154 may correspond to an address of the first byte in that block of data (although individual bytes can be addressed separately by the core 104). A valid field 142 in each cache line 140 indicates whether that cache line holds valid data.

Each cache line 140 also includes a coherency state field 144 for indicating a coherency state associated with the corresponding cache line, which may be used by the coherency controller 116 to manage coherency between data cached in the private caches of the respective cores. For example the coherency state 144 may indicate whether the data in the corresponding cache line is marked as dirty or clean, where dirty data is data that has been modified relative to the data for the corresponding address stored in the underlying memory system, so that the core owning this particular L1D$ 110 has responsibility for writing that data back to memory when it is evicted from the L1D$ 110. Clean data is data which is consistent with the underlying data stored in memory (or which may differ from the underlying data in memory but where the data is also cached in the private cache of another core 104 and that core has the responsibility to write back the data, so the core with the modified data marked as "clean" does not itself have responsibility for writeback). Hence, in general dirty data is data which is required to be written back on invalidation or eviction from the cache, and clean data is data which does not need to be written back on invalidation or eviction from the cache, but which can simply be discarded. The coherency protocol could also support other forms of coherency state, such as indicating whether data is private to an individual core or shared with another core. The particular definitions of the coherency state may depend on the protocol used.

Each cache line also includes some fields 146, 148, 150, 152 for supporting the transactional memory functionality. Data stored to the L1D$ 110 by a store instruction executing within a transaction is marked as speculative by setting an exclusive field 146 to a predetermined value (e.g. 1). Cache lines which are not associated with a still pending transaction have the exclusive field set to a different value (e.g. 0). When a cache line is allocated for a store operation executed within a pending transaction, a transaction identifier identifying that particular transaction is also allocated into the cache line and stored within a transaction identifier (TXID) field 148. Each cache line also includes a write set indicator 150 and a read set indicator 152, which respectively indicate whether the address associated with a corresponding cache line 140 is part of the write set or the read set for the transaction identified in the TXID field 148. On load operations executed within a pending transaction, the read set field 152 is set to indicate that this address was read during the transaction, and for store operations executed within a pending transaction the write set indicator 150 is set to indicate that this address was written to during the transaction.

The exclusive field 146 is used to control access to the cache so that speculative data stored to the cache within a transaction is not made accessible to other threads executing on either the same core executing the transaction or a different core. Hence on memory access requests made to the L1D$ 110 specifying a transaction identifier other than the transaction identifier specified in the TXID field 148 (or not specifying any valid transaction identifier), then a cache miss would be detected. Also, when the L1D$ 110 is snooped by the interconnect 114 in response to an access to a corresponding address from a different core, then even if the cache has a corresponding cache line with a tag 154 corresponding to that address, if the cache line is marked as exclusive in the exclusive field 146 then a snoop response indicating that the data is not available is returned to ensure that speculative results within a still-to-be-committed transaction are not made available to other threads.

The read and write set indicators 150, 152 are used for tracking the addresses accessed in the L1D$ 110 and for supporting conflict detection, so that the L1D$ 110 and the coherency mechanism provided by the coherency controller 116 can provide functionality corresponding to the address tracking circuitry 24 and the conflict detection circuitry 26. Attempts to read or write data associated with an address within the read or write set can be detected based on snoop requests received from the L2$ 112 and interconnect 114 which may be triggered by events at another core. If a snoop request is received which indicates that there could be an attempt to read data for an address marked as being within the write set 150 for a transaction where the corresponding cache line is still marked as exclusive, then this may indicate a potential conflict and an abort of the transaction may be triggered, causing any of the exclusive cache lines associated with the corresponding transaction ID to be invalidated to discard the speculative results. Also the abort may trigger the restoration of any restoration state saved at the start of the transaction. Similarly, an attempt at another core to write to an address marked as being within the read set or write set of a still pending transaction may generate an abort. Attempts by other cores to read an address which is marked as being within the read set of a pending transaction, but which is not marked as being within the write set, do not need to trigger an abort.

Figure 6:
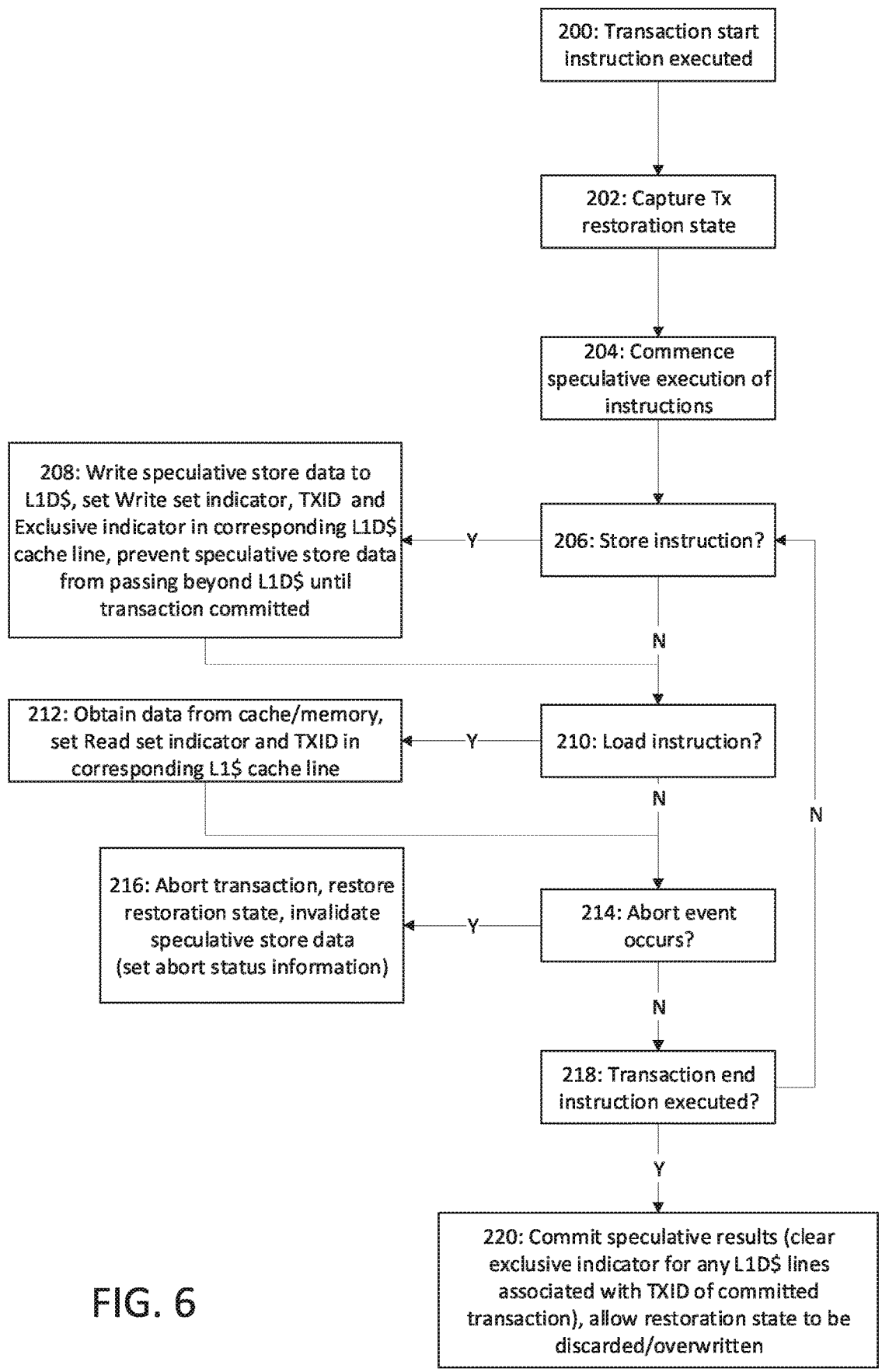
FIG. 6 is a flow diagram illustrating processing of a transaction.

FIG. 6 is a flow diagram illustrating processing of a transaction. At step 200 a transaction start instruction is executed by a given processor core 104, and this causes restoration state to be captured for the transaction at step 202. For example the current values in registers 6 may be stored to a backup storage location so that they are still available later if the transaction needs to be aborted. It is also possible to capture restoration state by changing register mappings used to identify which physical registers correspond to the architectural registers identified by instructions, to allow the capture of the restoration state to be performed without actually needing to transfer any data between storage elements, as the remapping may then cause subsequent updates to the architectural state to be performed in a different storage location to the location previously storing the state. It will be appreciated that there are a range of ways in which the restoration state can be captured, but in general an operation is performed to ensure that if necessary the contents of the registers 6 could be rewound to the state they had at the time of the transaction start instruction.

At step 204 the processor core 104 commences speculative execution of the instructions of the transaction.

At step 206 it is determined whether a store instruction for writing data to the memory system has been encountered during the processing of the transaction. If so then at step 208 speculative store data is written to the L1D$ 110 and the cache line 140 allocated with that data is updated to set the write set indicator 150 for the cache line to indicate that the corresponding address is part of the transaction's write set, update the TXID field 148 to indicate the identifier of the transaction being executed and set the exclusive indicator 146 to indicate that the data in that cache line is speculative store data which should be prevented from passing beyond the L1D$ 110 to further caches 112, 118 or memory until the transaction has been committed. Step 208 is omitted if no store instruction is encountered.

At step 210 the processor core determines whether a load instruction has been encountered (a load instruction is an instruction for transferring data from the memory system to the registers 6). If so, then at step 212 data for the target address of the load is obtained from the cache hierarchy or the memory system and allocated into the L1D$ 110 if not already present in the L1D$ 110. The read set indicator 152 is set for the cache line 140 which corresponds to the accessed address, and also the transaction identifier of the executed transaction is allocated to the TXID field 148 of that cache line 140. Step 212 is omitted if no load instruction is encountered. At step 214 the processor core 104 determines whether any abort event has occurred.

This may occur if a snoop request is received indicating that there is an attempt by another core to read an address for which the write set indicator 150 is set to indicate that the address is within the write set of the pending transaction, or to write an address indicated by write/read set indicators 152 as being within the read set or the write set of the pending transaction. Also an abort may be triggered if another thread executing on the same core as the thread involved in the transaction attempts to write an address included in the read set or write set, or read an address included in the write set. Also aborts may be triggered for non-conflict related reasons, such as due to the occurrence of an exception, due to an attempt to execute an instruction which is not allowed to be executed within a transaction, or based on resource constraints, such as if all the cache lines 140 of the L1D$ 110 have already been allocated for storing data marked as within the write set or read set of pending transactions, and the current transaction then attempts to access a further address that needs to be allocated into the L1D$ 110, where this allocation not possible without evicting another line marked as being within the read or write set of a transaction. It will be appreciated that this is not an exhaustive list of all the events which could cause an abort of a transaction.

When a transaction abort event occurs, then at step 216 the transaction is aborted and the restoration state which was captured at step 202 is restored so that when program execution resumes then the processor state is consistent with the state which would have occurred had the transaction never been executed. Cache lines 140 marked as exclusive which have the transaction identifier 148 set to match the transaction ID of the aborted transaction are invalidated, and the exclusive indication 146 in these lines may be cleared (or alternatively the clearing of the exclusive indication may occur at a later time when a non-transaction-related cache linefill occurs to allocate non-speculative data to the corresponding cache line 140). Optionally, abort status information could be recorded, for example within transaction abort information registers or another storage location in which information can be recorded about the cause of the transaction abort. This information could be read by software to determine how to resume after the abort of the transaction, for example helping software to distinguish between causes of aborts which may be likely to happen again and causes which may have happened once but may not happen if the transaction is repeated. Such abort status information could be used by the software to determine whether to continue trying to execute the operations as a transaction or whether to switch to the fallback code using the lock-based method as shown in FIG. 4.

If no abort event has occurred then at step 218 it is determined whether a transaction end instruction is executed. If so then at step 220 any speculative results for the transaction are committed. The cache lines 240 in the L1D$ 110 which are tagged with the transaction ID 148 of the committed transaction are updated to clear their exclusive indicators 146 so that these lines are no longer marked speculative. This means that these lines are now visible to other threads executing on the same core 104 and can be snooped by the interconnect 114 so that they may become accessible to processors operating on other cores 104. Also, on committing the transaction the processor core 4 may now allow discarding or overwriting of any restoration state which was captured for the transaction at step 202.

The method of FIG. 6 may loop through steps 206, 210, 214, 218 until one of these events occurs. While these steps are shown sequentially in FIG. 6, in other examples these could be performed in a different order or could be performed wholly or partially in parallel so that the different checks are ongoing simultaneously.

Figure 7:
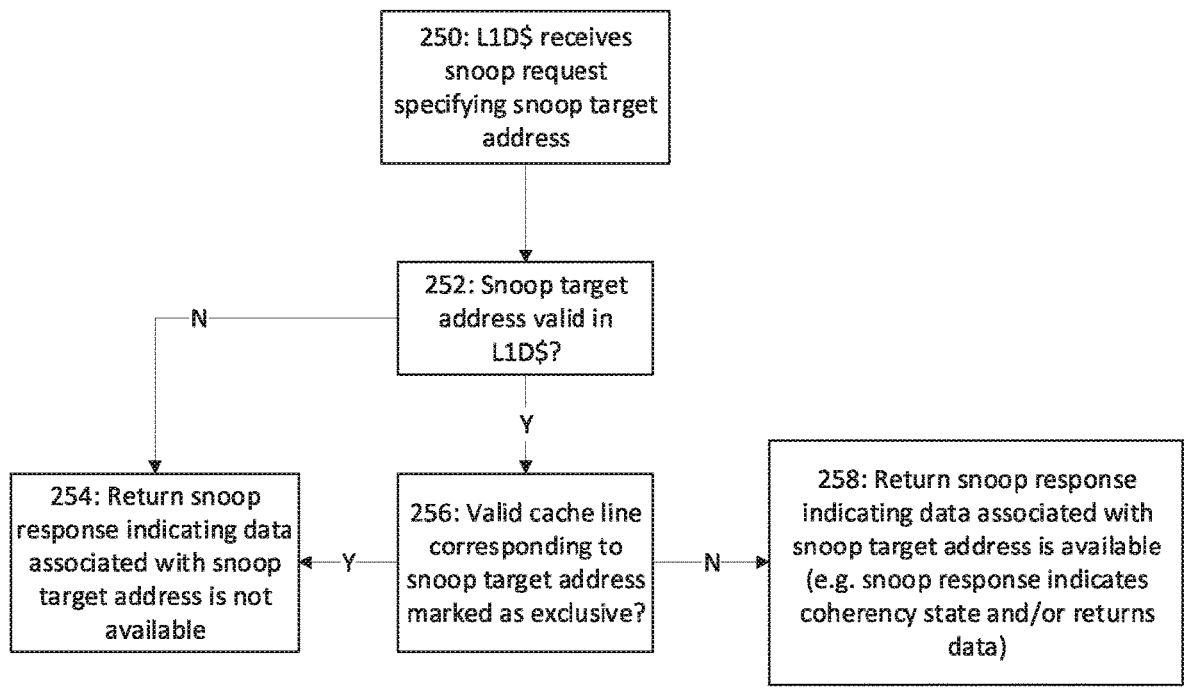
FIG. 7 is a flow diagram illustrating handling of snoop requests by the level one data cache.

FIG. 7 is a flow diagram showing processing of snoop requests by the L1D$. At step 250 the L1D$ receives a snoop request (e.g. from the L2$ 112). The snoop request may be issued as a consequence of a memory access being triggered on another processor core 104, and may specify a snoop address. The snoop request may request that the L1D$ 110 returns one of: an indication of whether the data for the snoop address is cached validly in the L1D$, a coherency state 144 associated with the data for the snoop address in the L1D$ 110 and/or a dirty value of the data for the address specified by the snoop request cached validly within the L1D$ (if the data is dirty). Different types of snoop requests may be provided to trigger different forms of response. It is also possible to receive snoop requests which may request that data is invalidated within the L1D$ for a given address (such types of snoop requests could be one of example of an event which triggers an abort of a transaction if the cache line from which data is invalidated in response to the snoop was marked as exclusive to a pending transaction).

Hence, at step 250 of FIG. 7 the L1D$ receives a snoop request which specifies a snoop target address for which some form of snoop response is required. At step 252 the L1D$ 110 determines whether the snoop target address is specified by the tag field 154 of a valid cache line 140 (a cache line 140 for which the valid indication 142 is set). If the snoop target address is not validly cached within the L1D$ then at step 254 a snoop response is returned indicating that the data associated with a snoop target address is not available.

If the L1D$ does include a valid cache line 140 with a tag 154 corresponding to the snoop target address, then at step 256 the L1D$ determines whether the valid cache line corresponding to the snoop target address is marked as exclusive 146. If not, then at step 258 a snoop response is returned to the L2$ 112 or the interconnect 114 indicating that the data associated with the snoop target address is available. For example the snoop response could indicate the coherency state of the data (such as whether the data is dirty) and/or (if the data is dirty) may also return the dirty data value associated with that address. On the other hand, if at step 256 it is found that the valid cache line corresponding to the snoop target address is marked as exclusive then again at step 254 a snoop response is returned indicating that the data associated with the snoop target address is not available. This prevents speculative data associated with a pending transaction that has not yet been aborted or committed from becoming available beyond the L1D$ 110. This helps to maintain the atomicity guarantees needed for operations performed within a transaction.

Typical HTM schemes have been designed for systems which do not have PM 124. Such existing HTM schemes would generally assume that the memory is volatile (such as the DRAM 120), and so after a transaction commits, it is acceptable for data in the volatile memory 120 to gradually be updated with the now-committed results of the transaction gradually over a period of time, as later cache evictions from the L1D$ 110 of the core 104 executing the transaction trigger write back of the store data written to the L1D$ 110 by the transaction. Hence, there will be a period of time where some of the addresses written to by the transaction may have been updated in memory 120 with new values calculated in the transaction, but other addresses which have been written in the transaction have not yet been updated in the volatile memory 120. Although temporarily there is a non-atomic view of the results of the transaction in the volatile memory 120, this is not a problem because accesses to those addresses will hit higher up the cache hierarchy and so return the correct values resulting from the complete committed transaction. Also, when volatile memory (e.g. DRAM) 120 is used, this means that even if there is a power failure or reset event occurring during the period when DRAM 120 has only partially been updated with the results of the transaction that was committed, then the data in the DRAM 120 and in the cache hierarchy will be lost or reset, and so upon resuming after a power cycle or reset, there will not be any stored data remaining in the volatile memory 120 or cache hierarchy which represents the partial results of the transaction.

However, with the development of systems which use PM 124 as byte-addressable random access memory, the inclusion of PM 124 means that state written to the PM 124 before a power failure or reset event may still be visible after recovering from the power down event or reset. This can be beneficial in some scenarios as the recovered data still in the PM may allow subsequent processing to resume faster than if the data had been lost and it may be less necessary to repeat processing that was performed before the power failure or reset event.

However, when PM 124 is used in conjunction with a core 104 supporting HTM, then most existing HTMs schemes do not work plug-and-play with PM, as if a power failure or reset event occurs during the period after committing a transaction when only partial results of the transactions have been written back to PM 124, then this means that following the recovery from the power failure or reset a non-atomic view of the results of the transaction may be visible in the data stored in PM 124, which breaks the guarantees required by an HTM scheme. In other words, as existing HTM systems concern only atomic visibility but not atomic durability, that is existing HTM may guarantee concurrent atomicity in terms of visibility (by other concurrent threads) but may not guarantee power failure atomicity (with regards to persistent memory, i.e., what the recovery thread can observe after the power cycle from persistent memory). Put another way, existing HTMs concern only the atomicity (A), consistency (C) and isolation (I) part of "ACID" but not the durability (D) of transactions.

Some mechanisms for dealing this may include allowing cacheline flushes inside a hardware transaction or to provide hardware logging mechanisms for tracking the addressed accessed within a transaction within the PM 124, but this would require hardware changes to caches and memory controller and/or Instruction Set Architecture changes, and may require code written for HTM systems not supporting PM to be recompiled to account for these changes.

Figure 9:
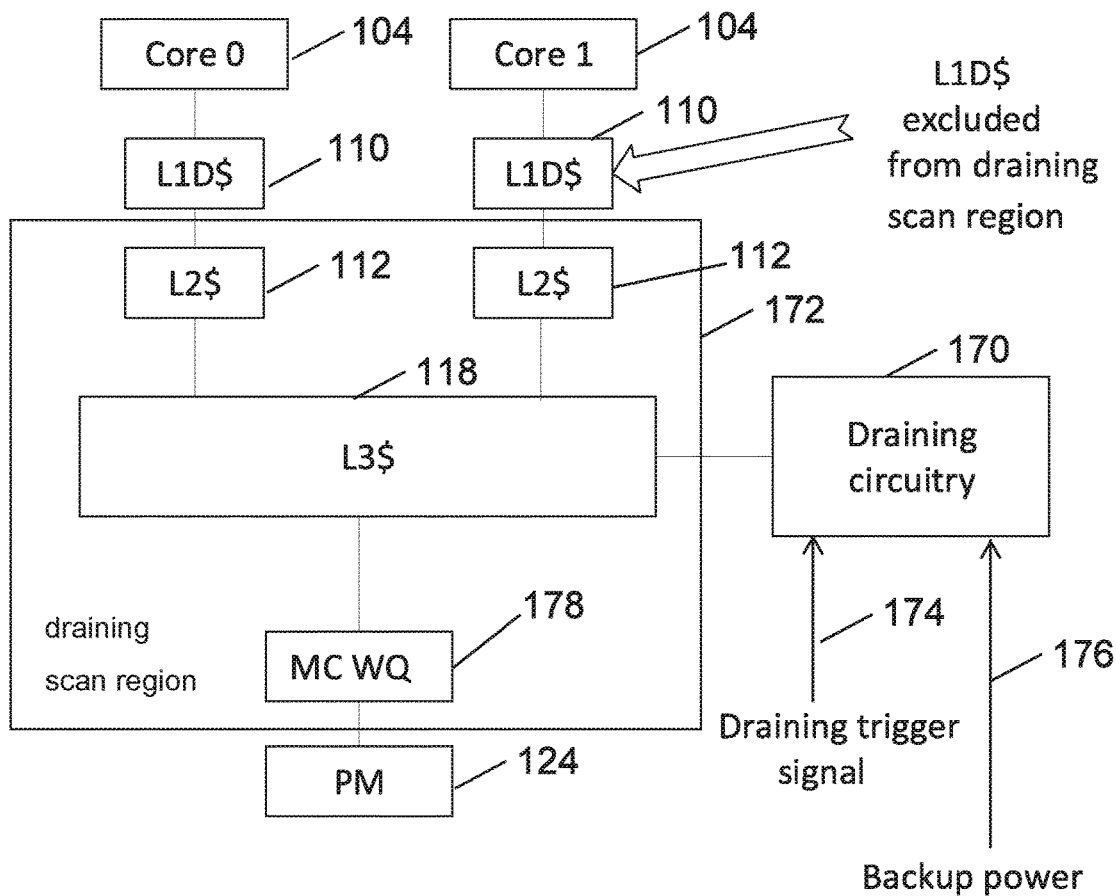
FIG. 9 illustrates an example of draining circuitry for performing the draining operation to scan a subset of the cache hierarchy to identify dirty cache lines and write the dirty cache lines to persistent memory, where the subset of the cache hierarchy excludes the level one data cache.
Figure 8:
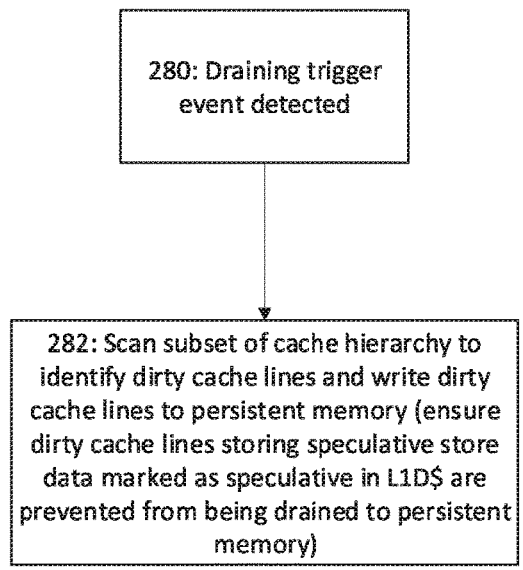
FIG. 8 illustrates a method of performing a draining operation in response to a draining trigger event.
Figure 10:
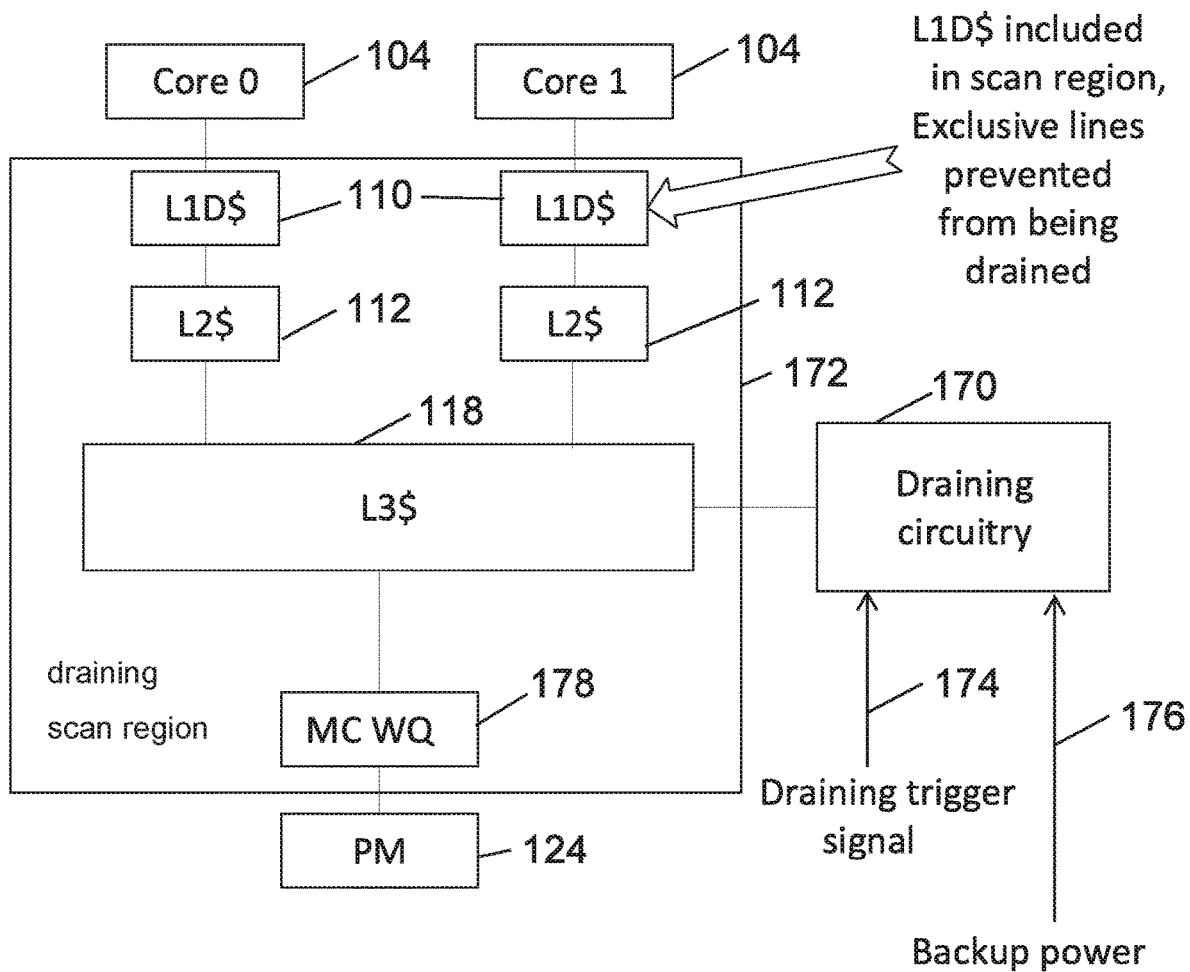
FIG. 10 shows an alternative example where the subset of the cache hierarchy scanned in the draining operation includes the level one data cache.

FIGS. 8-10 show an alternative technique for addressing this problem which requires less change to the ISA or the hardware of the caches 110, 112, 118 and memory controller 126 and does not require addresses accessed within a transaction to be logged to PM 124. This technique allows the problem described above to be addressed without needing any change to software already written for systems supporting HTM which do not have PM 124.

FIG. 8 shows a flow diagram showing a method of responding to a draining trigger event, which could be a power down event or a reset event for example. As shown in FIG. 9, the apparatus may be provided with draining circuitry 170 which receives a draining trigger signal 174 which indicates whether the draining trigger event has occurred. When the draining trigger event is detected at step 280 of FIG. 8, at step 282 the draining circuitry 174 performs a draining operation to scan a subset of the cache hierarchy to identify dirty cache lines, and write the dirty cache lines to PM 124 (while ensuring that any cache lines in the L1D$ marked as speculative are prevented from being drained to the PM 124).

As shown in the example of FIG. 9, the draining circuitry 170 may be coupled to a backup power supply input 176, which supplies power from a backup power supply, such as a battery or capacitor, which can be used when the power failure occurs in the main power supply used to supply the processor core 104 and caches with power during normal operation. In this example the draining circuitry 170 and the L1D$ 110, L2$ 112 and L3$ 118 are coupled to the backup power supply input 176 (for conciseness, the connections between the backup power supply input 176 and the caches are not shown in the drawing, but would be provided in practice). Also, the memory controller 126 may include a pending write queue (WQ) 178 which is also coupled to the backup power supply input 176. During normal processing, the processor core 104, caches 110, 112, 118 and memory controller WQ 178 and PM 124 are supplied with power from the main power supply. If a power failure in the main power supply is detected, the backup supply is used to support the draining operation being performed.

Hence, when the draining trigger signal 174 indicates that the draining trigger event (e.g. power failure in the main supply, or a reset event) has been detected, the draining circuitry 170 triggers a draining operation to be performed, which comprises scanning a subset of the cache hierarchy to identify dirty cache lines and write the dirty cache lines to the PM 124. In the example of FIG. 9 the scanning performed in the draining operation is applied to a draining scan region 172 of the memory system which includes the L2$ 112, the L3$ 118 and the memory controller write queue 178. In the example of FIG. 9 the L1D$ 110 are excluded from the draining scan region.

For the storage structures within the draining scan region 172, when the draining trigger signals a draining trigger event, the draining circuitry scans through each storage location (e.g. cache line or write queue entry) of those storage structures 112, 118, 178 and checks whether those locations comprise dirty data, and if the location stores dirty data, write that dirty data back to the PM 124 to preserve it (note that, in the case of a memory controller write queue entry, all entries of the write queue 178 may be considered dirty). This means that if any of those dirty data values were generated by a recently committed transaction, then the complete results of the transaction will be ensured to be written back to PM 124 to ensure atomicity. The backup power supply input 176 ensures that there is sufficient power to perform this draining operation even if the main power supply used in normal operation has failed.

In the example of FIG. 9, as the L2$ 112 is an inclusive cache, the dirty entries in the L1D$ 110 will also have a corresponding entry in the L2$ 112, so it is not necessary to perform the scanning operation on the L1D$s 110. By excluding the L1D$s from the draining scan region 172, this reduces the overall time taken to perform the draining operation and so the backup power supply need not have a larger capacity to handle the draining operation, which allows cheaper forms of backup power supply to be used, such as the battery or capacitor mentioned above. Also, this makes the draining circuitry 170 simpler, as it does not need to check whether a dirty line in L1D$ is part of a non-committed transaction and skip draining such lines (as in the example of FIG. 10 discussed below). Also the processor cores 104 do not need to coupled to the backup power supply because the backup power is intended only to provide a relatively limited amount of power sufficient to allow the draining operation to be performed and need not provide sufficient power to allow the processor core to carry on with program execution.

Although the L1D$ 110 is excluded from the draining scan region, the L1D$ 110 is nevertheless connected to the backup power supply input 176 so that it can respond to snoop requests issued from the L2$ 112 for addresses marked as dirty in the L2$ for which the modified data value is present in the L1D$ 110. If the L1D$ includes any cache lines 140 still marked as exclusive 146 for a pending transaction at the time of the draining trigger event, then a snoop response indicating that the data is not available will be returned by the L1D$ (as set out in steps 256 and 254 of FIG. 7) and so this dirty data will not be drained to the PM 124. Although the results of any processing that was pending within the not yet committed transaction will therefore be lost after the power cycle or reset, this is not a problem and is in fact preferable because this will ensure that an atomic view of the transaction is seen in PM 124 afterwards, with any given transaction having its results either propagated to PM 124 in their entirety or not seen at all. On the other hand, if there are any cache lines 140 which were previously marked as exclusive to indicate speculative store data for a transaction, but for which the transaction has now been committed and so the exclusive indicators 146 were cleared, then the snoop requests sent from the L2$ 112 during the draining operation will trigger a snoop response from the L1D$ 110 which may provide the up to date data and then this can be written back to the PM 124 to ensure that the complete results of a processor transaction are propagated through to PM 124 so that after the recovery from the draining trigger events an atomic view of the results of the transaction will be seen. Although some extra power is needed to allow the L1D$ 110 to respond to such snoop requests, the power consumed is much less than if the L1D$ was itself scanned line by line to identify the dirty data, so the approach shown in FIG. 9 can be beneficial to reduce the cost of implementing the backup power supply and reduce the complexity of the draining circuitry 170.

Hence, the scheme shown in FIG. 9 provides a backup energy source to allow draining of cache lines in the L2$, L3$ and memory controller write pending queue to PM upon power failure. The core 104 and L1D$ 110 are not in the scanned domain, just the dirty lines in between L2$ and PM in the scanned domain 172 are drained to PM upon power failures. The draining of dirty cache lines to PM is handled by a dedicated finite state machine circuitry 170 in the processor, so the cores 104 can be powered off at the detection of power failure while backup energy kicks in to flush the cache lines in the scanned domain 172 to PM 124 with the draining circuitry 170. The L1 data caches still are powered on, despite not in the scanned domain 172, as stale lines in the inclusive L2$ 112 will fetch new data by snooping the L1D$ 110 above. The L1D$ 110 is therefore effectively in the scanned domain 172, but as L2 is inclusive, no extra provision of backup energy is needed for actually scanning L1D$ line by line. When a power failure happens before a transaction is committed, as the L1D$ 110 is not in the scanned, the dirty lines in L1D$ 110 (marked as speculative for the partially executed TX) cannot be drained, in the same sense as they can't be made visible to other concurrent threads (concurrent atomicity), since the exclusive indicator 146 is set for these lines. Once a transaction in one thread is made visible to another thread (i.e., a concurrent observer), it becomes guaranteed to become persistent too (or visible to the persistent observer from PM), either due to writebacks occurring naturally as the no-longer-speculative lines associated with the committed transaction are evicted from the L1D$ 110, or on a power failure or reset due to the draining operation performed by draining circuitry 170. This is because (1) if a cacheline in L1D$ 110 for core 0 is requested by a thread in core 1, the cacheline would cross over from the L1D$ 110 to the L2$ 112 associated with core 0 and core 1, and hence would be within the draining scan region 172, and 2) if a line in L1D$ 110 for core 0 is requested by a thread on the same core 0, the line does not need to cross from L1D$ 110 to L2$ 112 of core 0, but in this case the draining circuitry would pull in the updated cacheline in 110 when performing the draining operation. This means that applications that run with HTM (on volatile DRAM) would require no code change to work with PM, greatly simplifying the programming challenges associated with enabling use of PM.

FIG. 10 shows an alternative approach to the example shown in FIG. 9. As in FIG. 9, draining circuitry 170 is provided to perform the draining operation in response to a draining trigger event, but this time the L1D$ 110 is included in the draining scan region 172. This approach could be used for a system which uses a non-inclusive L2$ 112, to ensure that any dirty data resulting from a committed transaction within the L1D$ is drained to the PM. With this approach, as the L1D$ is scanned directly there may be no need for the L2$ to issue snoops to the L1D$, and instead the L1D$ 110 and the L2$ 112 may be scanned separately to identify the dirty data. Also, in this example, when the L1D$ 110 is scanned by the draining circuitry 170, then any cache lines 140 for which the exclusive indicator 146 is set to mark the data as speculative will not be drained to PM 124. Otherwise the approach shown in FIG. 10 is the same as in FIG. 9 (except that the draining circuitry 170 may be slightly more complex in FIG. 10, due to including circuit logic to check, when scanning the L1D$ 110, whether a dirty line in L1D$ 110 is part of a non-committed transaction, and skipping draining such dirty lines if so—this circuit logic would not be needed in FIG. 9).

In both the examples shown in FIGS. 9 and 10, the memory controller write queue 178 is included within the draining scan region 172, to ensure that if any pending write requests to write data generated within a committed transaction are still pending in the write queue 178 at the time of the draining trigger event, then these are propagated through to the PM 124 to ensure that the overall set of data within the PM 124 that is present upon recovery from the draining trigger event is consistent with the atomic results generated by the transaction. Note that in other examples, the memory controller write queue 178 could be implemented using PM to provide non-volatile storage, and in this case it is not necessary for the memory controller write queue 178 to be within the draining scan region 172. Similarly, if a last-level cache such as the L3$ 118 was implemented using PM, the last-level cache would not need to be within the draining scan region 172. Also, if the last-level cache 118 is implemented using PM, then when performing the draining operation the dirty lines drained from higher levels of cache 110, 112 may not be written all the way to the main memory PM module 124, but may be written back to the last-level cache 118 instead.

While FIGS. 9 and 10 only show a single draining circuitry 170 associated with multiple cores 104, in a multi-core system such as in FIG. 1, each core 104 may be associated with such draining circuitry 170. Also, in some implementations, separate instances of draining circuitry 170 could be associated with each cache level 110, 112, 118 associated with a particular core 104, rather than being considered to form a single draining circuitry 170 associated with the core as a whole.

Figure 11:
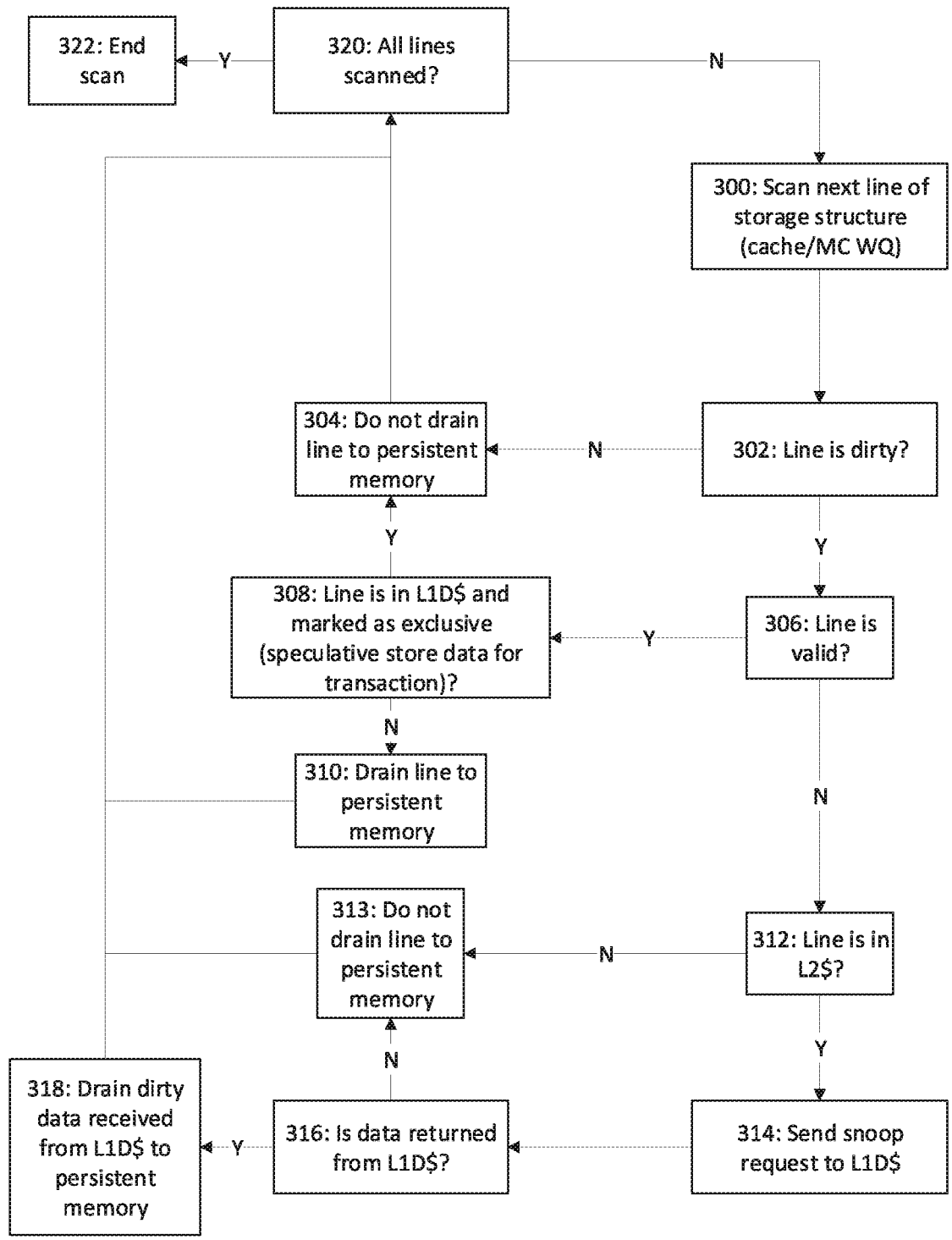
FIG. 11 is a flow diagram illustrating a method of performing the draining operation.

FIG. 11 is a flow diagram showing in more detail the draining operation performed at step 282 of FIG. 8. The steps shown in FIG. 11 shows the scanning operation for a single storage structure 110, 112, 118 or 178 within the draining scan region 172. The method of FIG. 11 may be performed separately for each of the storage structures within the draining scan region 172, either in parallel or sequentially. For conciseness, FIG. 11 only shows the steps for scanning one of these structures.

At step 300 the draining circuitry 170 scans the next line of the storage structure being scanned (which could be a line of a cache 110, 112, 118 or an entry in the memory controller write queue 178). At step 302 the draining circuitry 170 determines whether the scanned line of the storage structure is dirty. For caches this may be determined based on the coherency state indicator 144 (or a dirty indicator) associated with the scanned cache line. For the memory controller write queue 178, all pending entries in that queue may be considered dirty by default. If the scanned line is not dirty then at step 304 the draining circuitry 170 determines that the line does not need to be drained to PM 124, and at step 320 it is determined whether all lines of the storage structure have already been scanned and if so then at step 322 the scan ends. If lines still await to be scanned then the method returned to step 300 to scan the next line of the storage structure.

On the other hand, if at step 302 the scanned line is determined to be dirty then at step 306 the draining circuitry 170 determines whether the scanned line is valid. If so then at step 308 the draining circuitry 170 determines whether the scanned line is within the L1D$ 110 and has the exclusive indicator 146 set to mark the cache line as exclusive, indicating that the data 156 in that cache line is speculative store data for a pending transaction. If so, then at step 304 the cache line 140 of the L1D$ is not drained to PM 124, because this line is still speculative and should not be propagated through to downstream caches or PM until the corresponding transaction has committed. On the other hand, if the scanned cache line determined to be valid at step 306 is not in the L1D$, or is in the L1D$ 110 but is not marked as exclusive, then at step 310 the scanned cache line is drained to PM. If the structure being scanned is a cache 110, 112, 118, the draining circuitry 170 controls the cache to generate a write back request to write back the data from the scanned cache line to PM 124. Similarly, if the line is in the memory controller write queue 178 then the pending write request is processed to write the corresponding data to PM 124.

It will be appreciated that in embodiments such as FIG. 9 where the L1D$ is excluded from the draining scan region, then the answer at step 308 will always be no and so effectively in such embodiments the method can proceed straight from step 306 to step 310 when the scanned cache line is dirty and valid. In this case there is no need to check for the condition at step 308. Also it will be appreciated that in practice step 308 may not be implemented as an explicit check of whether the line is in the L1D$, but rather in embodiments where the L1D$ 110 is inside the draining scan region 172, the draining circuitry 170 may include a first set of scanning logic corresponding to the L1D$ 110 for which there is a check of whether the line is dirty, valid and non-exclusive, and which triggers draining of the line to PM 124 when all those requirements are met, and a second set of scanning logic associated with other cache or memory structures which omits the check about the exclusivity of the cache line and simply writes the data back to memory if the line is dirty and valid.

If at step 306 the scanned line of the storage structure is determined to be dirty but invalid then the method proceeds to step 312 (this could occur in examples where the L2$ 112 or L3$ 118 is an inclusive cache and includes a cache line corresponding to dirty data stored in the L1D$ 110, where the corresponding entry in the L2$ 112 or L3$ 118 is marked as invalid and dirty to signal that the L2$ 112 or L3$ 118$ does not hold the up to date data but there is data elsewhere in the L1D$ which would need to be written back to memory). At step 312 the draining circuitry 170 determines whether the line is in the L2$ 112 or the L3$ 118. If the line is in the L3$ 118 then at step 313 the line is not drained to PM 124, and the method proceeds to step 320 to determine whether all lines have been scanned.

If the scanned line is determined at step 312 to be in the L2$ 112 then at step 314 a snoop request is sent to the L1D$ 110 to request the up to date copy of the data and at step 316 it is determined whether a snoop response comprising the dirty data has been returned from the L1D$. Alternatively, in some examples step 314 may not need explicit action by the draining circuitry 170. In some implementations, all snoops to the L1D$ 110 may be issued via the L2$ 112, so in this case the draining circuitry 170 may act similar to a DMA master which simply tries to read the required line in the L2$ 112 at step 300, and if the line is determined to be dirty, this would cause the L2$ 112 to issue a snoop request to the L1D$ 110 to pull in the dirty data. Regardless of whether the snoop request to the L1$ 110 is sent by the L2$ 112 or the draining circuitry 170, the snoop response comprising the dirty data may be returned by the L1D$ if the snooped cache line is marked as non-exclusive, but if it is marked as exclusive then it is still associated with a pending transaction that has not yet committed and so the corresponding snoop response would indicate that the data is not available. If the snoop response received from the L1D$ 110 indicates that the data is not available (or otherwise does not return dirty data), then at step 313 the scanned line of the L2$ is not drained to PM and the method then returns to step 320 to determine whether there are any more lines to scan. In contrast, if the snoop response from the L1D$ provides the dirty data then the dirty data received from the L1D$ 110 is drained to PM at step 318 and again the method returns to step 320. Eventually, having scanned all the lines of the storage structure the method ends at step 322 and then the backup power supply can be powered down (assuming that all the other storage structures to be scanned have also completed).

In the example of FIG. 11, a cache line in the L2$ 112 is identified as being modified-but-stale in cases where it is dirty (step 302) and invalid (step 306). However, other examples could use a different technique to indicate whether cache lines are modified-but-stale. More generally, the snoop request sent at step 314 may be issued if a modified-but-stale cache line is identified when scanning at least one further level cache.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to support processing of a transaction comprising instructions processed speculatively between a transaction start instruction and a transaction end instruction, for which the processing circuitry is configured to prevent commitment of results of the speculatively processed instructions until the transaction end instruction is reached in the absence of the transaction being aborted; and
a cache hierarchy comprising at least two levels of cache; in which:
in response to a store instruction processed within a transaction, the processing circuitry is configured to write speculative store data to the cache hierarchy with the speculative store data marked as speculative to prevent the speculative store data passing beyond a predetermined level cache in the cache hierarchy to at least one further level cache until the transaction is committed; and
the apparatus comprises draining circuitry to detect a draining trigger event having potential to cause loss of state stored in the at least one further level cache, and in response to detection of the draining trigger event, to perform a draining operation to scan a subset of the cache hierarchy to identify dirty cache lines and write data associated with the dirty cache lines to persistent memory, the subset of the cache hierarchy comprising the at least one further level cache, where in the draining operation, the draining circuitry is configured to ensure that dirty cache lines storing speculative store data marked as speculative in the predetermined level cache are prevented from being drained to the persistent memory.

2. The apparatus according to claim 1, in which the subset of the cache hierarchy scanned by the draining circuitry excludes the predetermined level cache.

3. The apparatus according to claim 1, in which the subset of the cache hierarchy scanned by the draining circuitry includes the predetermined level cache, and when the draining circuitry scans the predetermined level cache to identify the dirty cache lines, the draining circuitry is configured to prevent dirty cache lines storing speculative store data marked as speculative from being drained to the persistent memory.

4. The apparatus according to claim 1, comprising a memory controller write queue to queue data waiting to be written to the persistent memory; in which:

in response to the draining trigger event, the draining circuitry is configured to cause pending write data stored in the memory controller write queue to be written to the persistent memory.

5. The apparatus according to claim 4, in which the draining circuitry, the at least one further level cache, and the memory controller write queue are coupled to a backup power supply input for supplying backup power during the draining operation, where the backup power supply input is separate from a main power supply input for supplying power to the processing circuitry.

6. The apparatus according to claim 1, in which a last-level cache of the cache hierarchy is implemented using persistent memory, and the subset of the cache hierarchy excludes the last-level cache.

7. The apparatus according to claim 1, in which the draining trigger event comprises at least one of:
a reset event; and
a power down event.

8. The apparatus according to claim 1, in which the draining circuitry and the at least one further level cache are coupled to a backup power supply input for supplying backup power during the draining operation, where the backup power supply input is separate from a main power supply input for supplying power to the processing circuitry.

9. The apparatus according to claim 8, in which the predetermined level cache is also coupled to the backup power supply input.

10. The apparatus according to claim 1, in which when scanning of the at least one further level cache identifies a modified-but-stale cache line, the draining circuitry is configured to trigger a snoop request to be issued to the predetermined level cache to request updated data associated with the modified-but-stale cache line, and in response to receiving the updated data, to write the updated data to the persistent memory.

11. The apparatus according to claim 10, in which in response to a snoop request specifying a snoop target address associated with speculative store data marked as speculative in the predetermined level cache, the predetermined level cache is configured to return a snoop response indicating that the data associated with the snoop target address is not available in the predetermined level cache.

12. The apparatus according to claim 1, in which the predetermined level cache is configured to store working set tracking indicators to mark cache lines associated with a working set of addresses accessed within a transaction.

13. The apparatus according to claim 1, in which the predetermined level cache is a level 1 data cache.

14. The apparatus according to claim 1, in which the persistent memory is byte-addressable.

15. The apparatus according to claim 1, in which the persistent memory comprises one or both of:
at least one off-chip persistent memory module; and
at least one on-chip persistent memory module acting as one or more levels of buffers.

16. An apparatus comprising:
means for processing instructions, supporting processing of a transaction comprising instructions processed speculatively between a transaction start instruction and a transaction end instruction, for which the means for processing is configured to prevent commitment of results of the speculatively processed instructions until the transaction end instruction is reached in the absence of the transaction being aborted; and means for caching data in a cache hierarchy comprising at least two levels of cache; in which:
in response to a store instruction processed within a transaction, the means for processing is configured to write speculative store data to the means for caching with the speculative store data marked as speculative to prevent the speculative store data passing beyond a predetermined level cache in the cache hierarchy to at least one further level cache until the transaction is committed; and
the apparatus comprises means for draining cached data to persistent memory, where in response to detecting a draining trigger event having potential to cause loss of state stored in the at least one further level cache, the means for draining is configured to perform a draining operation to scan a subset of the cache hierarchy to identify dirty cache lines and write data associated with the dirty cache lines to the persistent memory, the subset of the cache hierarchy comprising the at least one further level cache, where in the draining operation, the means for draining is configured to ensure that dirty cache lines storing speculative store data marked as speculative in the predetermined level cache are prevented from being drained to the persistent memory.

17. A method comprising:
processing a transaction comprising instructions processed speculatively between a transaction start instruction and a transaction end instruction, for which commitment of results of the speculatively processed instructions is prevented until the transaction end instruction is reached in the absence of the transaction being aborted;
in response to a store instruction processed within a transaction, writing speculative store data to a cache hierarchy comprising at least two levels of cache, with the speculative store data marked as speculative to prevent the speculative store data passing beyond a predetermined level cache in the cache hierarchy to at least one further level cache until the transaction is committed; and
in response to detection of a draining trigger event having potential to cause loss of state stored in the at least one further level cache, performing a draining operation to scan a subset of the cache hierarchy to identify dirty cache lines and write data associated with the dirty cache lines to persistent memory, the subset of the cache hierarchy comprising the at least one further level cache, where when performing the draining operation, dirty cache lines storing speculative store data marked as speculative in the predetermined level cache are prevented from being drained to the persistent memory.

\* \* \* \* \*